Jan. 3, 1939.    T. J. NUNAN    2,142,251
THREAD TESTING DEVICE
Filed March 5, 1935    15 Sheets—Sheet 1

INVENTOR.
Thomas J. Nunan
BY
Gifford, Scull & Burgess.
ATTORNEYS.

Jan. 3, 1939. T. J. NUNAN 2,142,251
THREAD TESTING DEVICE
Filed March 5, 1935 15 Sheets-Sheet 2
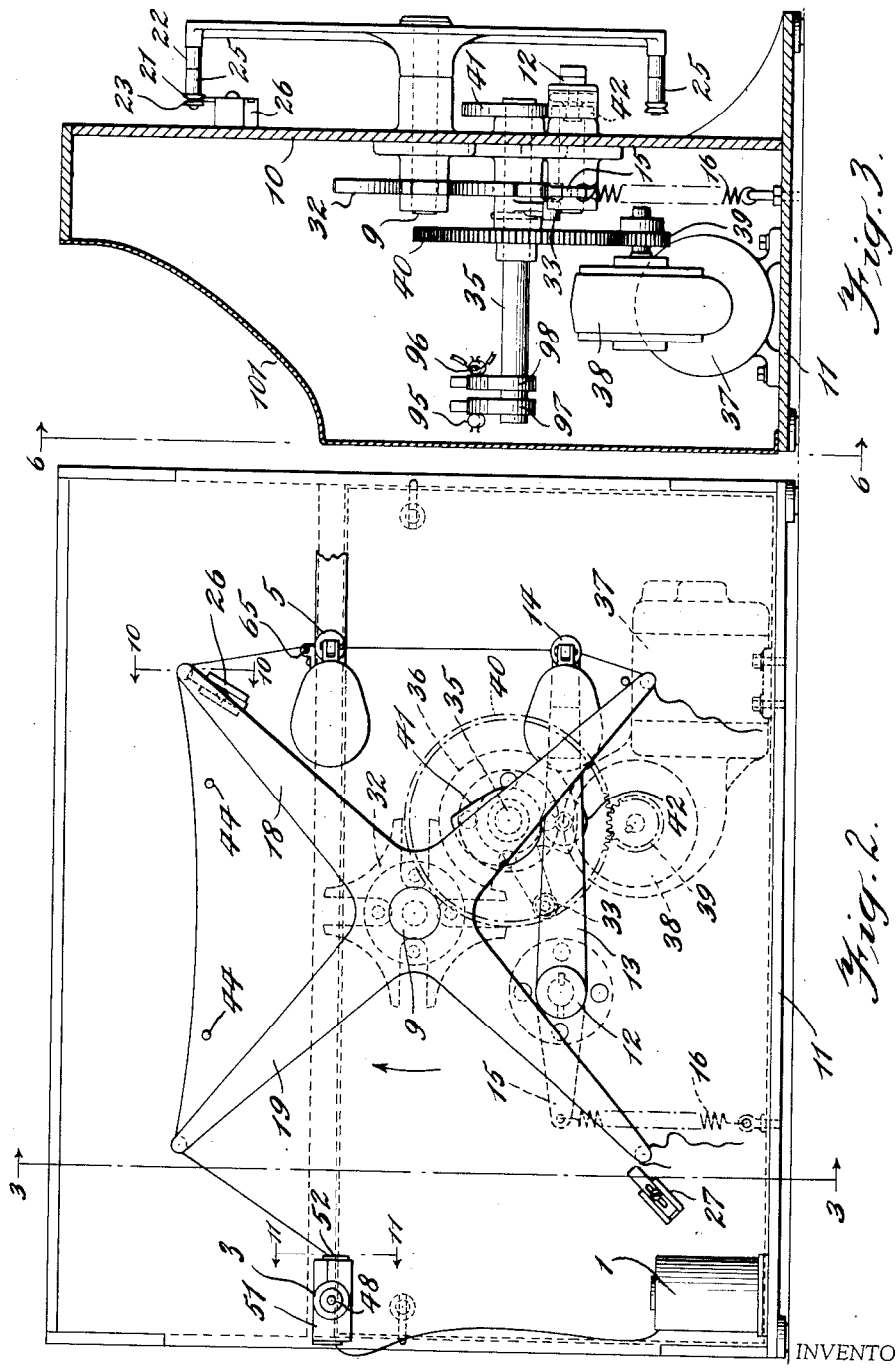
INVENTOR.
Thomas J. Nunan
BY
Gifford, Scull & Burgess
ATTORNEYS.

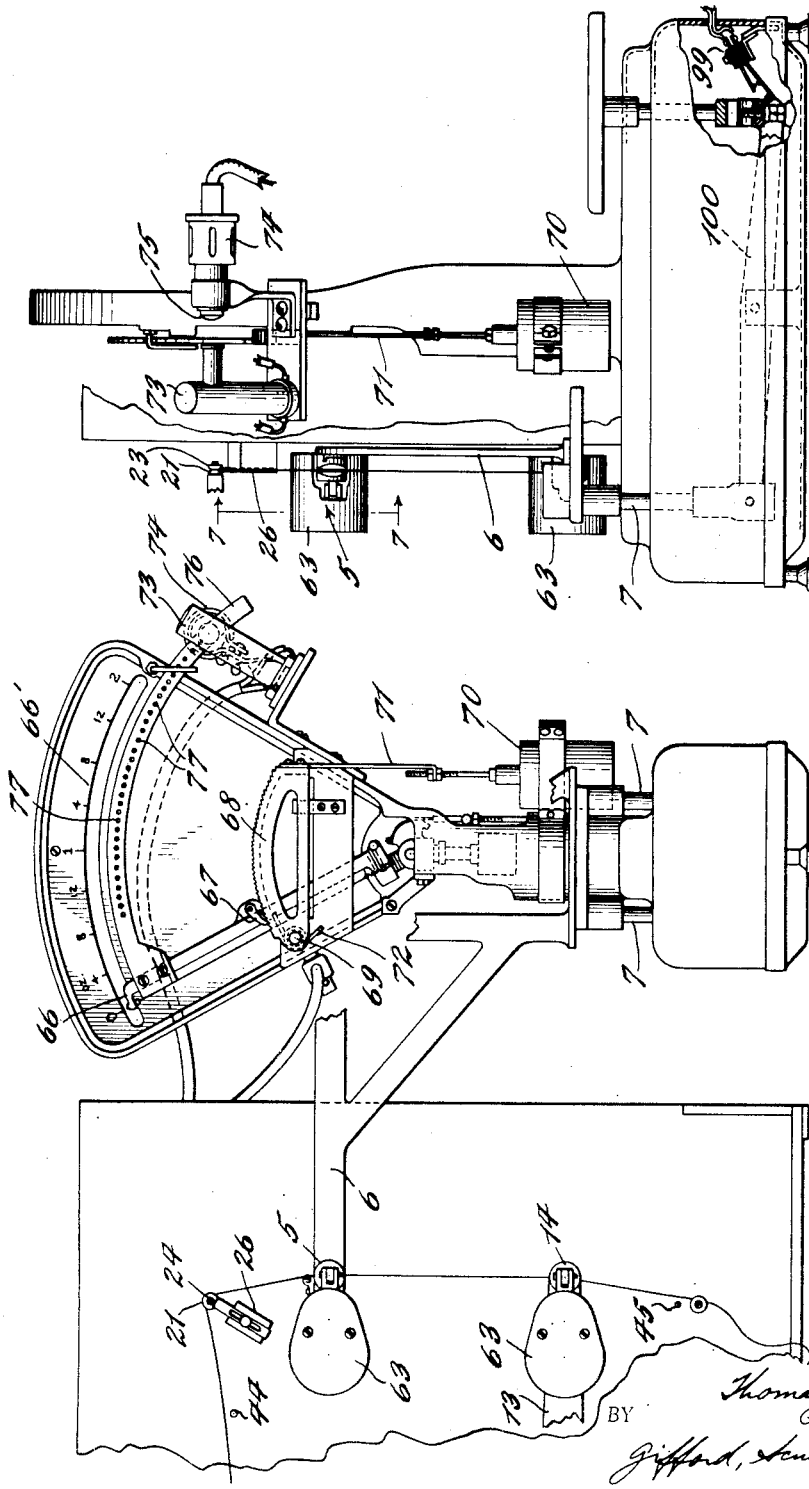

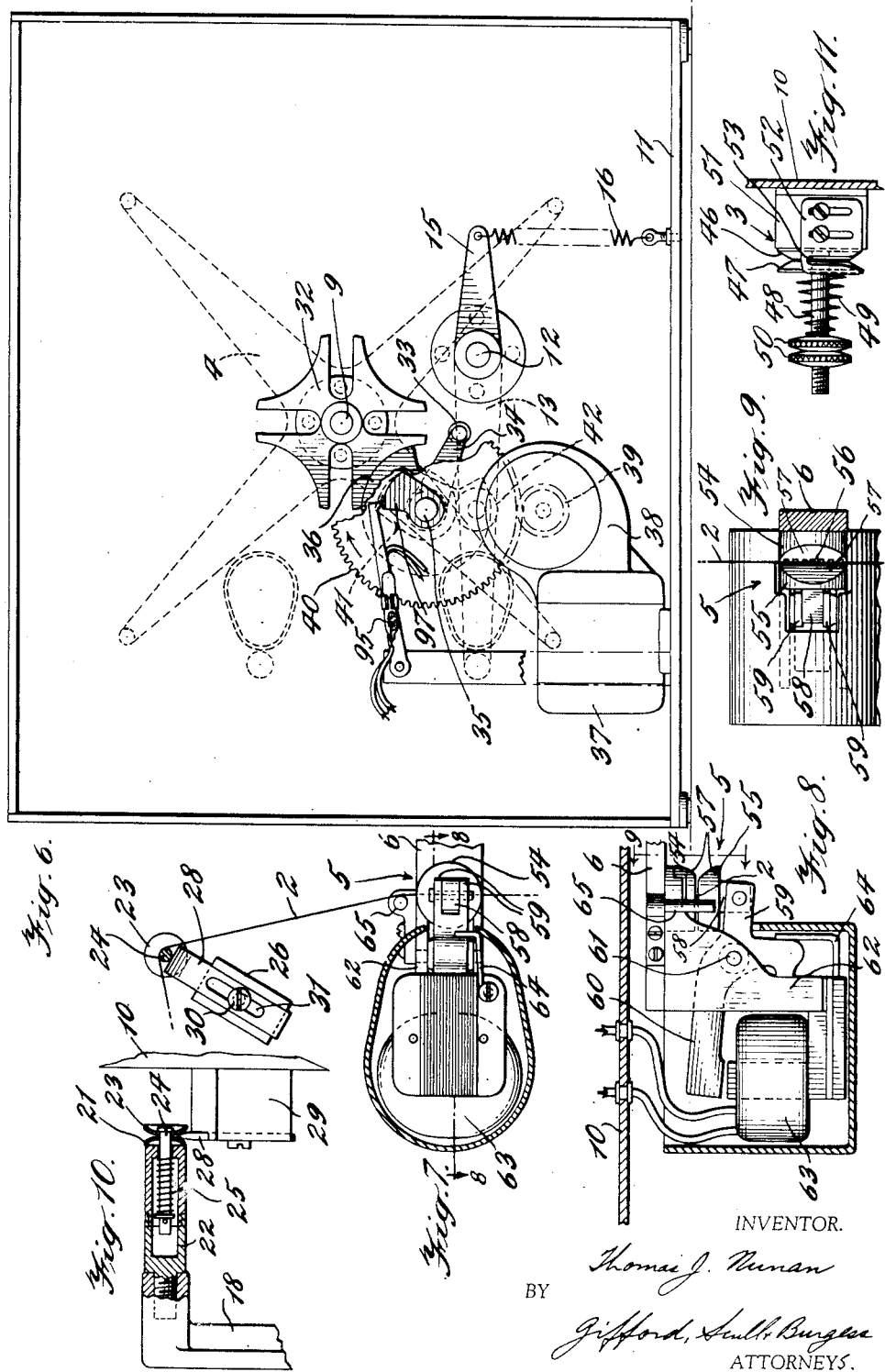

Jan. 3, 1939.   T. J. NUNAN   2,142,251
THREAD TESTING DEVICE
Filed March 5, 1935    15 Sheets-Sheet 5
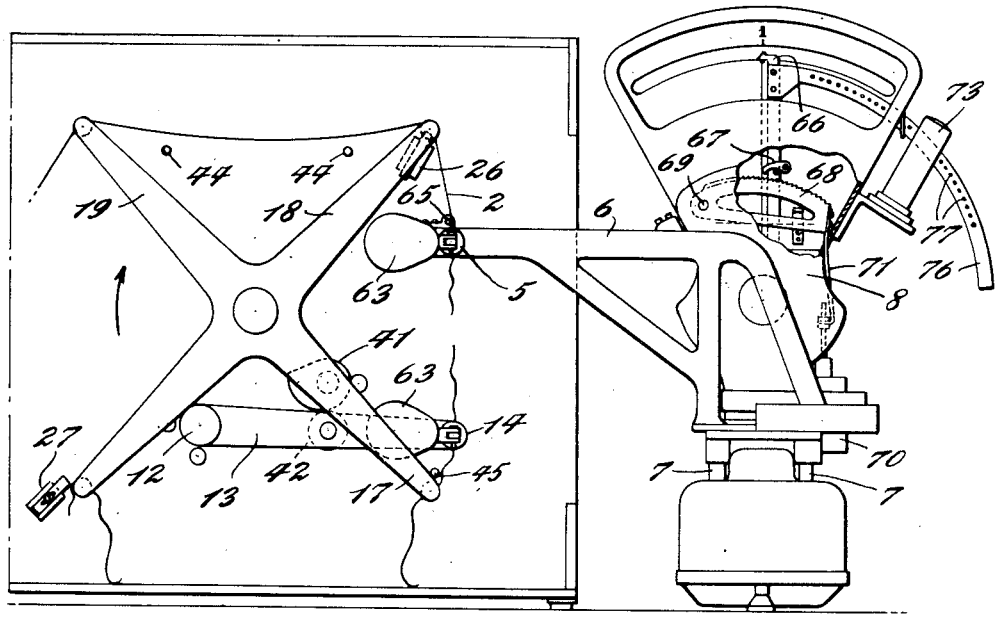
Fig. 12.
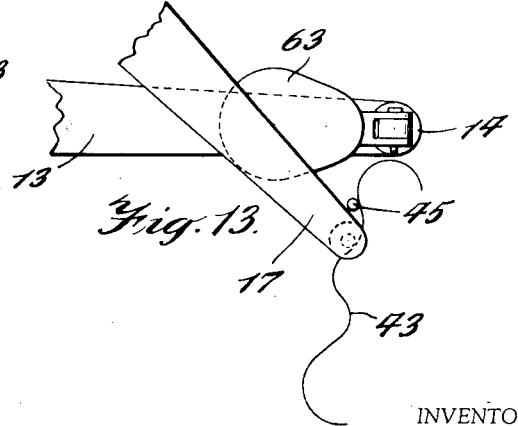
Fig. 13.
| | |
|---|---|
| 1 | 14 |
| 1 | 10 |
| 1 | 7 |
| 1 | 15 |
| 10 | 111 |
| | |
| 1 | 15 |
| 1 | 10 |
| 1 | 13 |
| 1 | 10 |
| 1 | 19 |
| 1 | 12 |
| 1 | 8 |
| 1 | 13 |
| 1 | 11 |
| 1 | 6 |
| 10 | 117 |
Fig. 14.
INVENTOR.
Thomas J. Nunan
BY
Gifford, Scull & Burgess
ATTORNEYS.

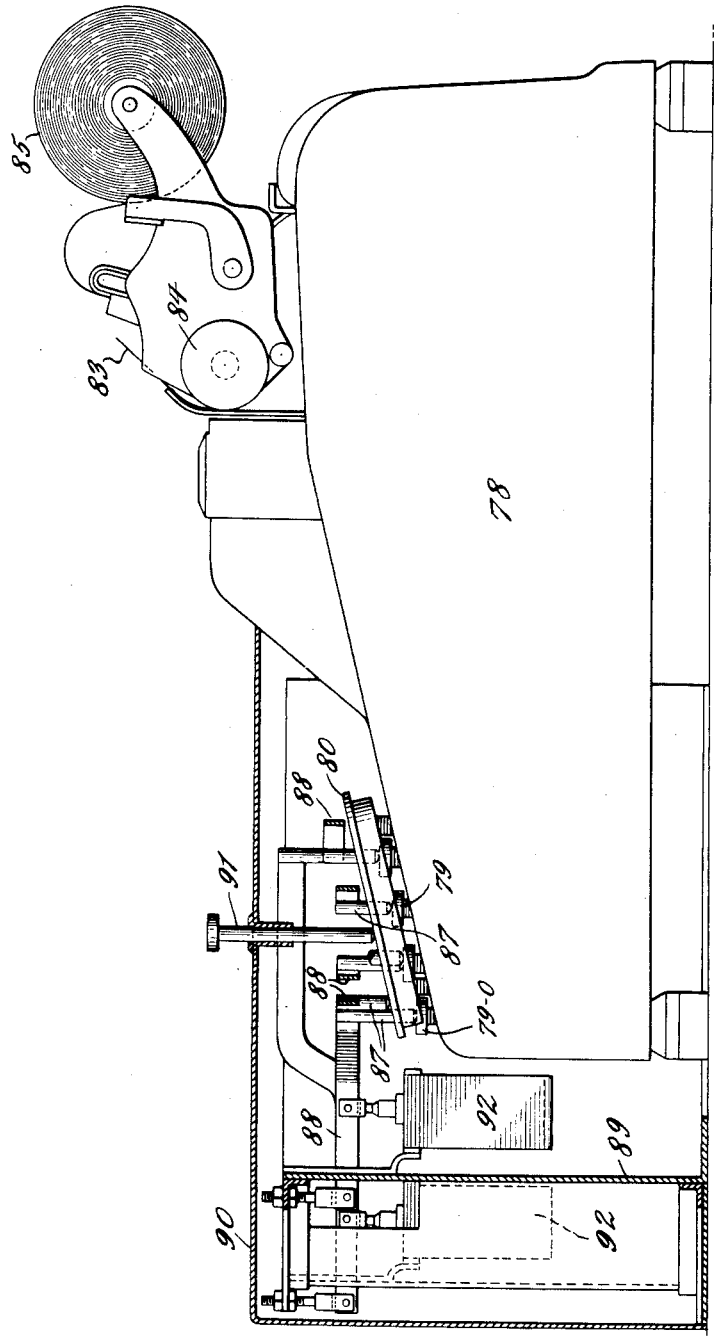

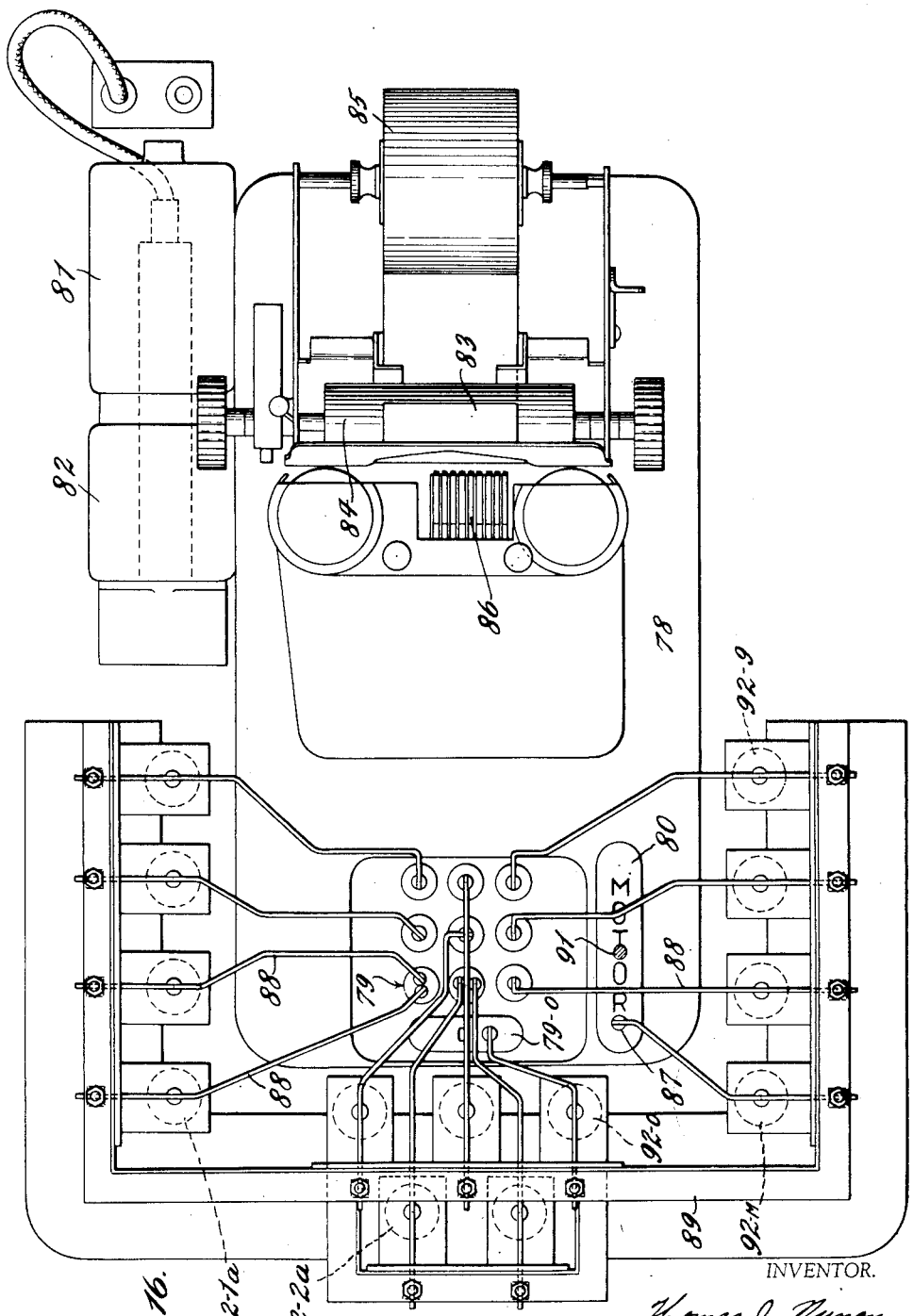

Jan. 3, 1939. T. J. NUNAN 2,142,251
THREAD TESTING DEVICE
Filed March 5, 1935 15 Sheets-Sheet 8
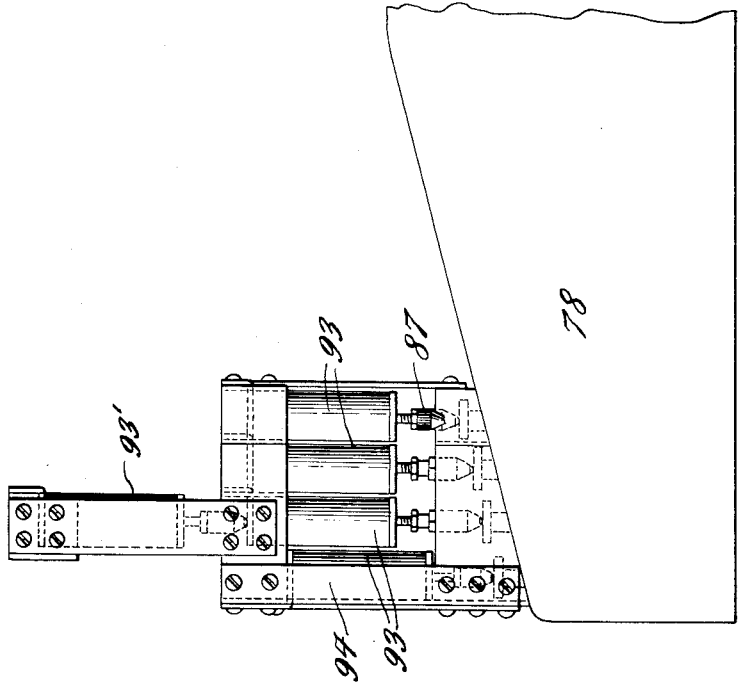
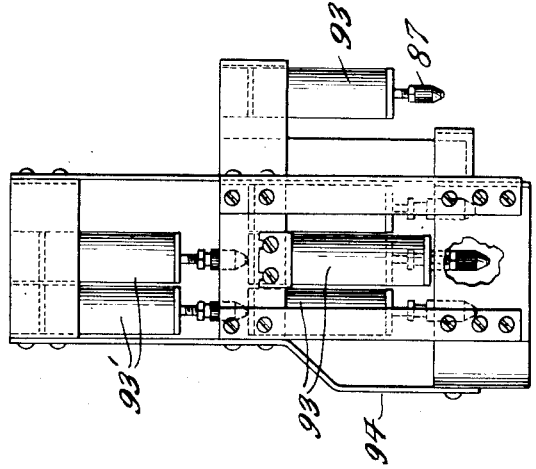
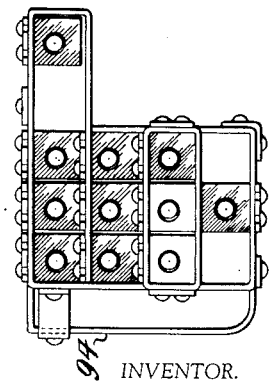
INVENTOR.
Thomas J. Nunan
BY
Gifford, Scull & Burgess
ATTORNEYS.

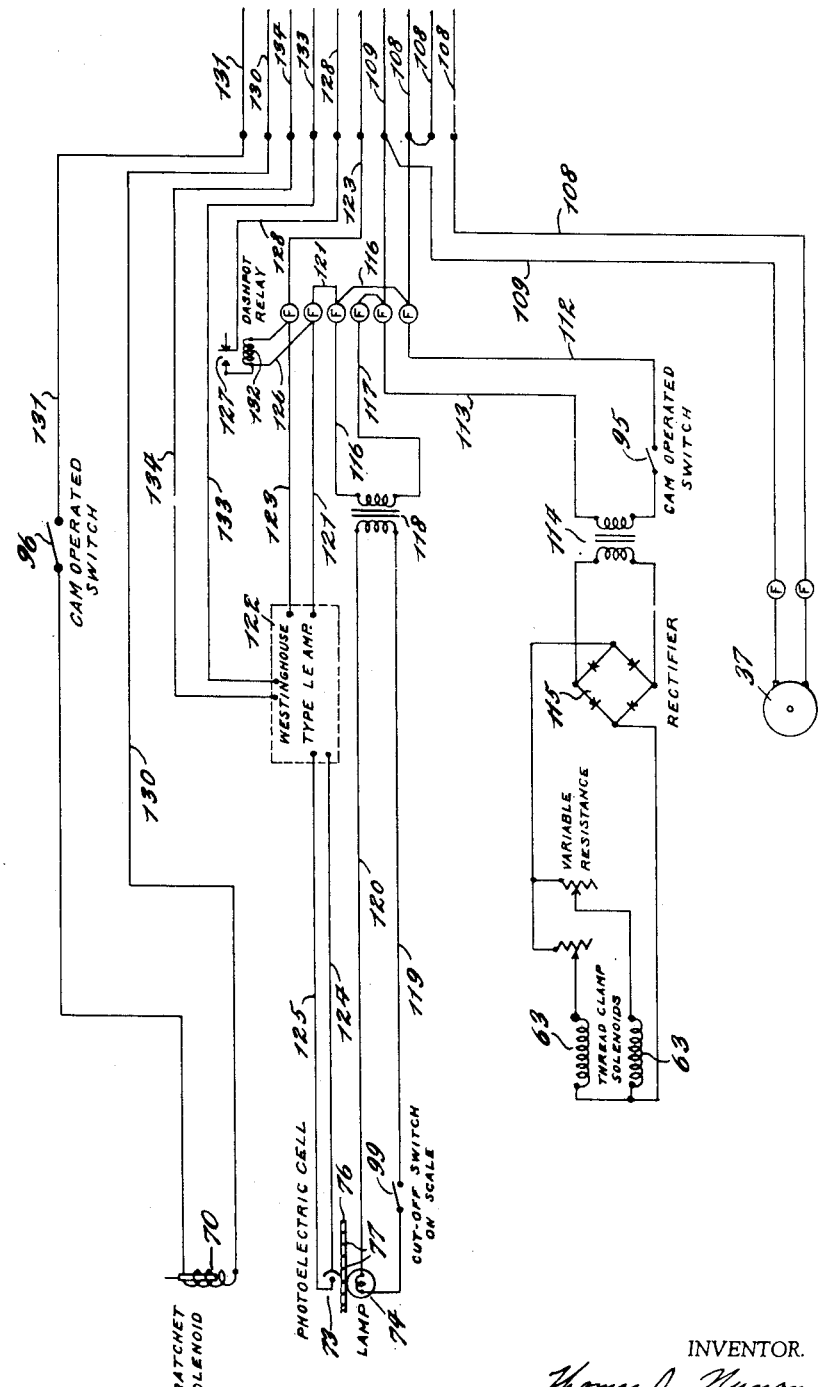

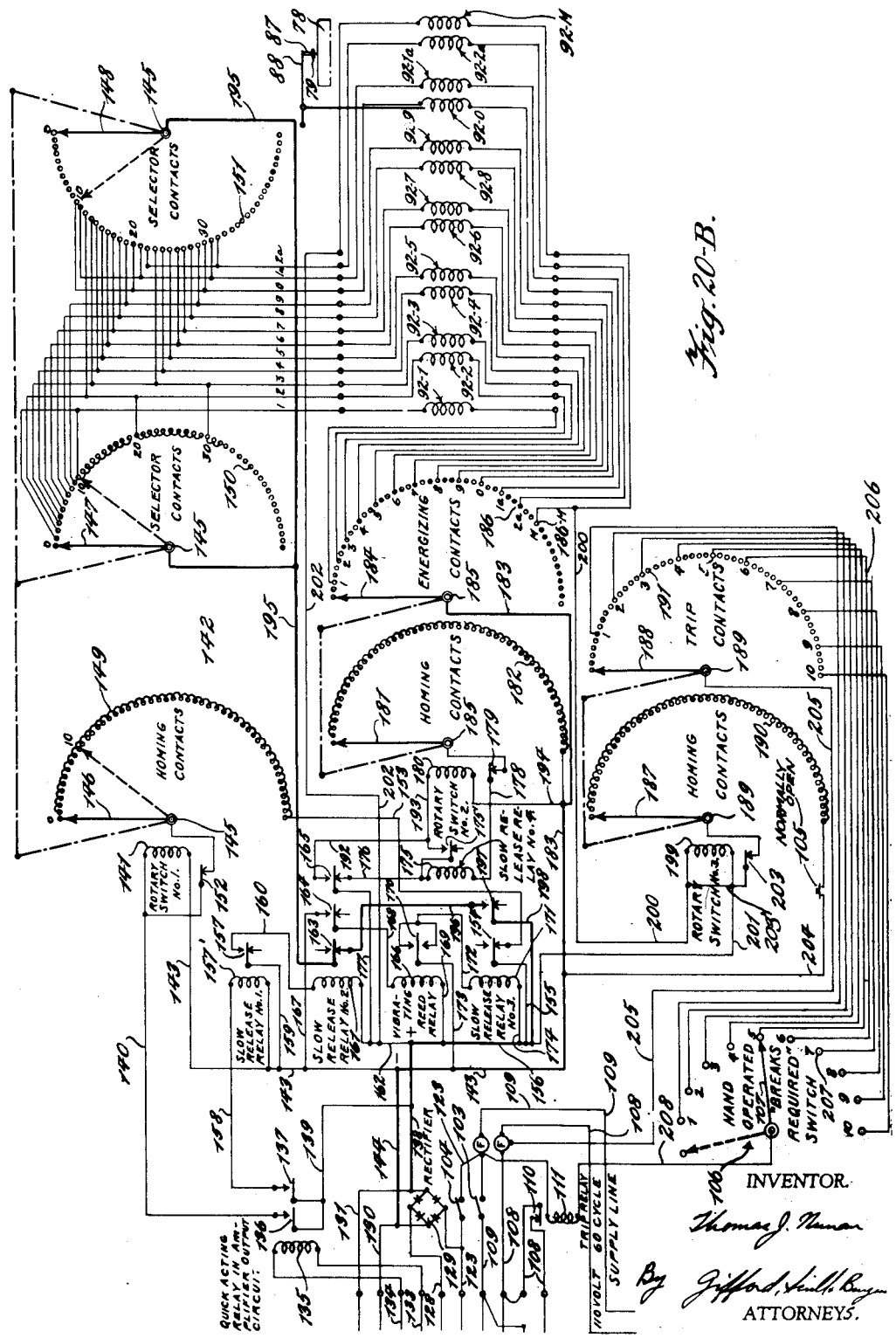

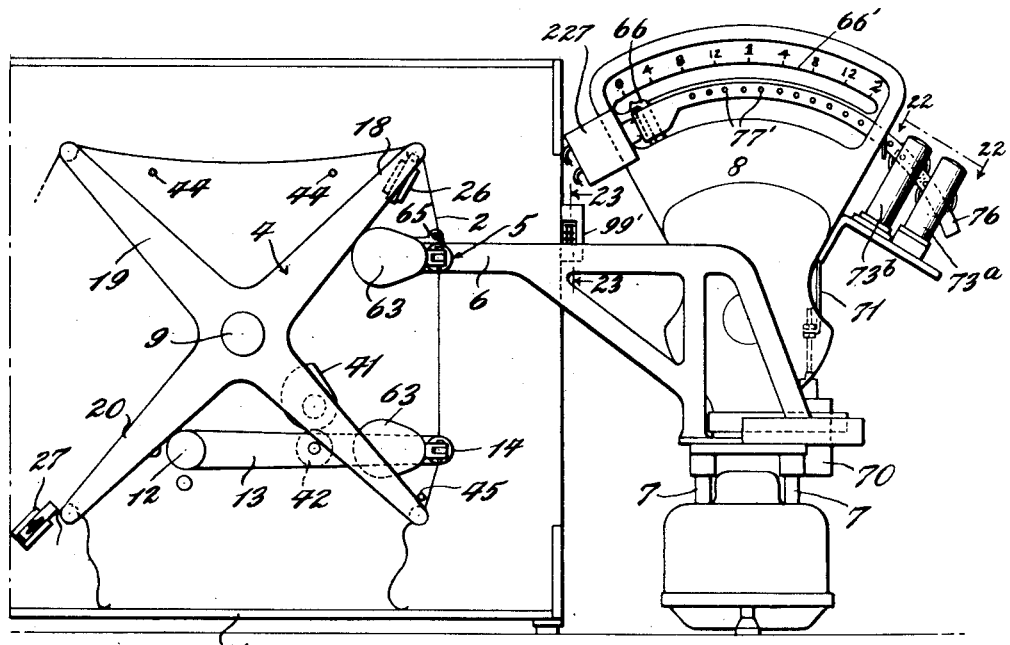
Fig. 21.
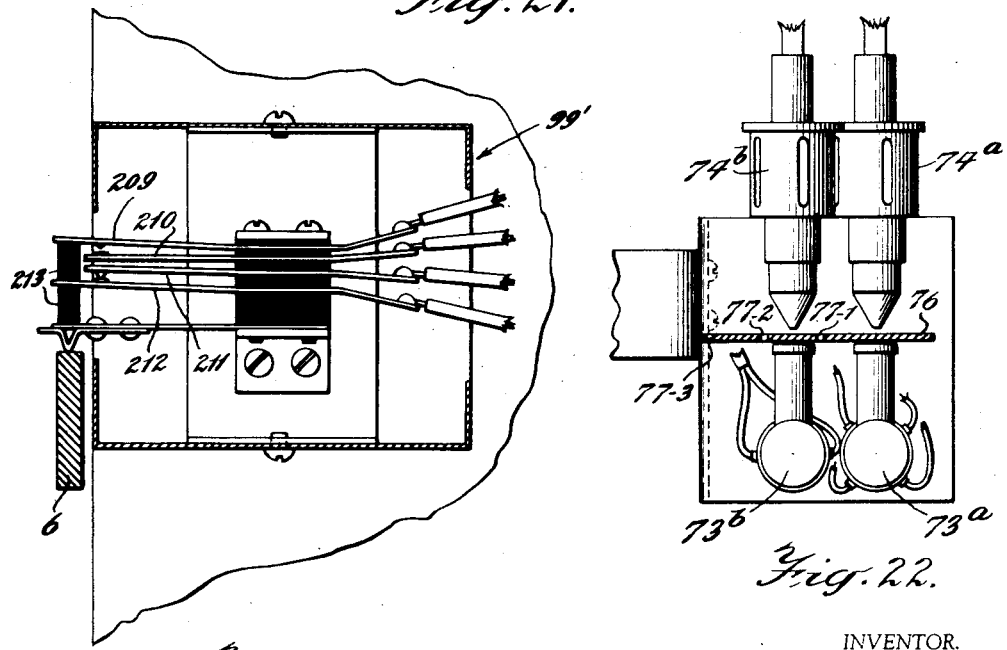
Fig. 23.
Fig. 22.
INVENTOR.
Thomas J. Nunan
BY
ATTORNEYS.

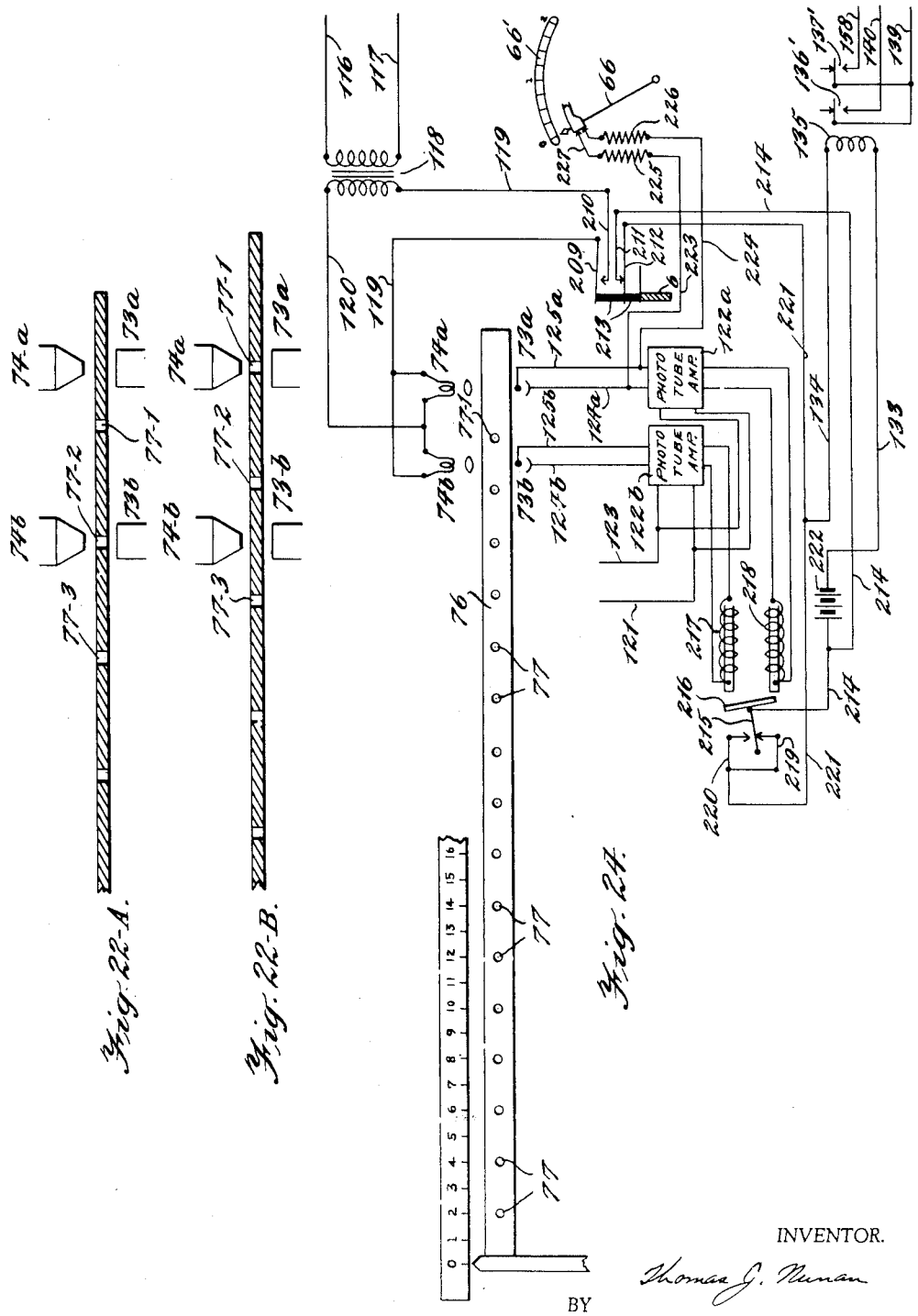

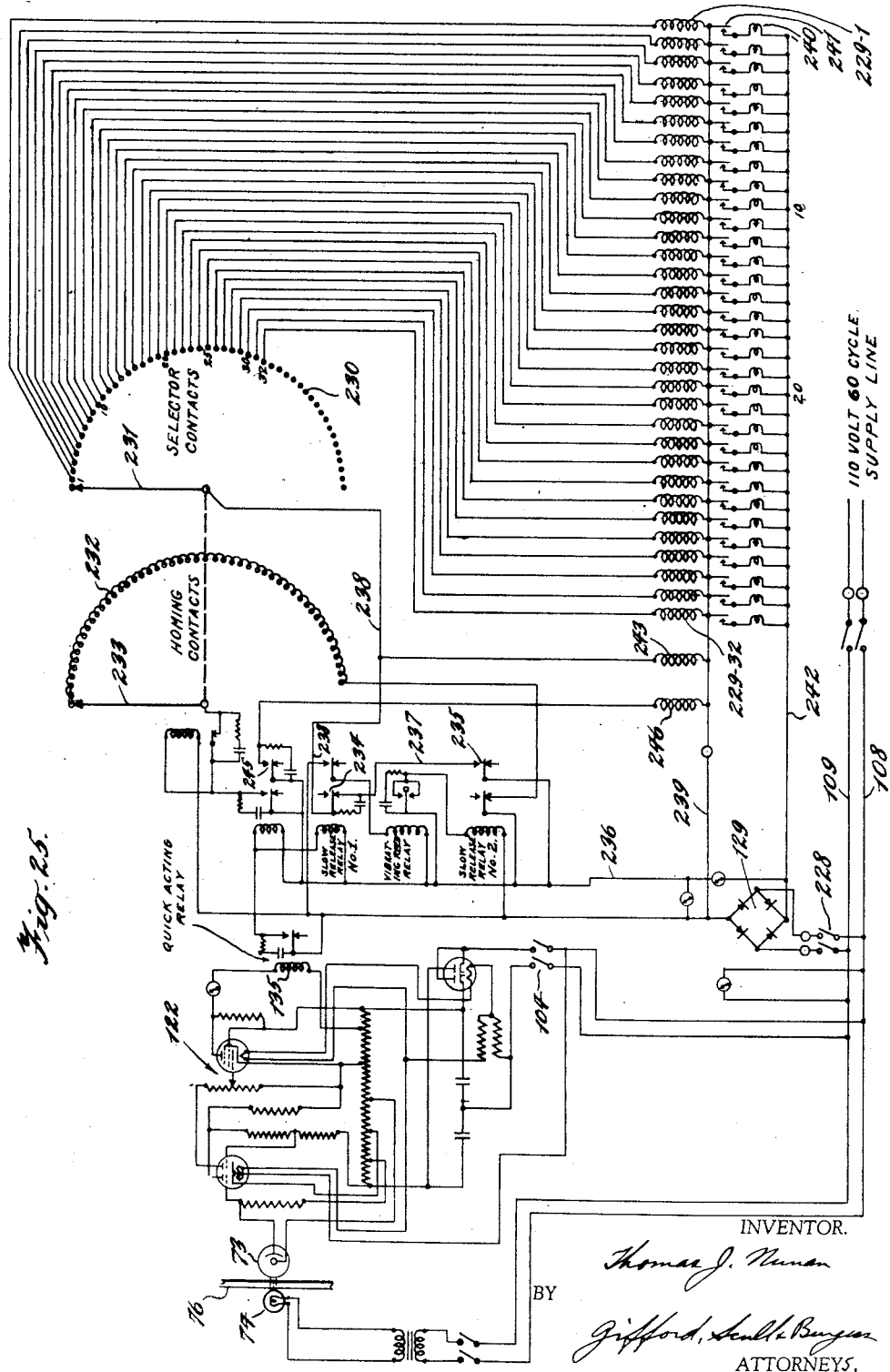

Jan. 3, 1939. T. J. NUNAN 2,142,251
THREAD TESTING DEVICE
Filed March 5, 1935 15 Sheets-Sheet 14
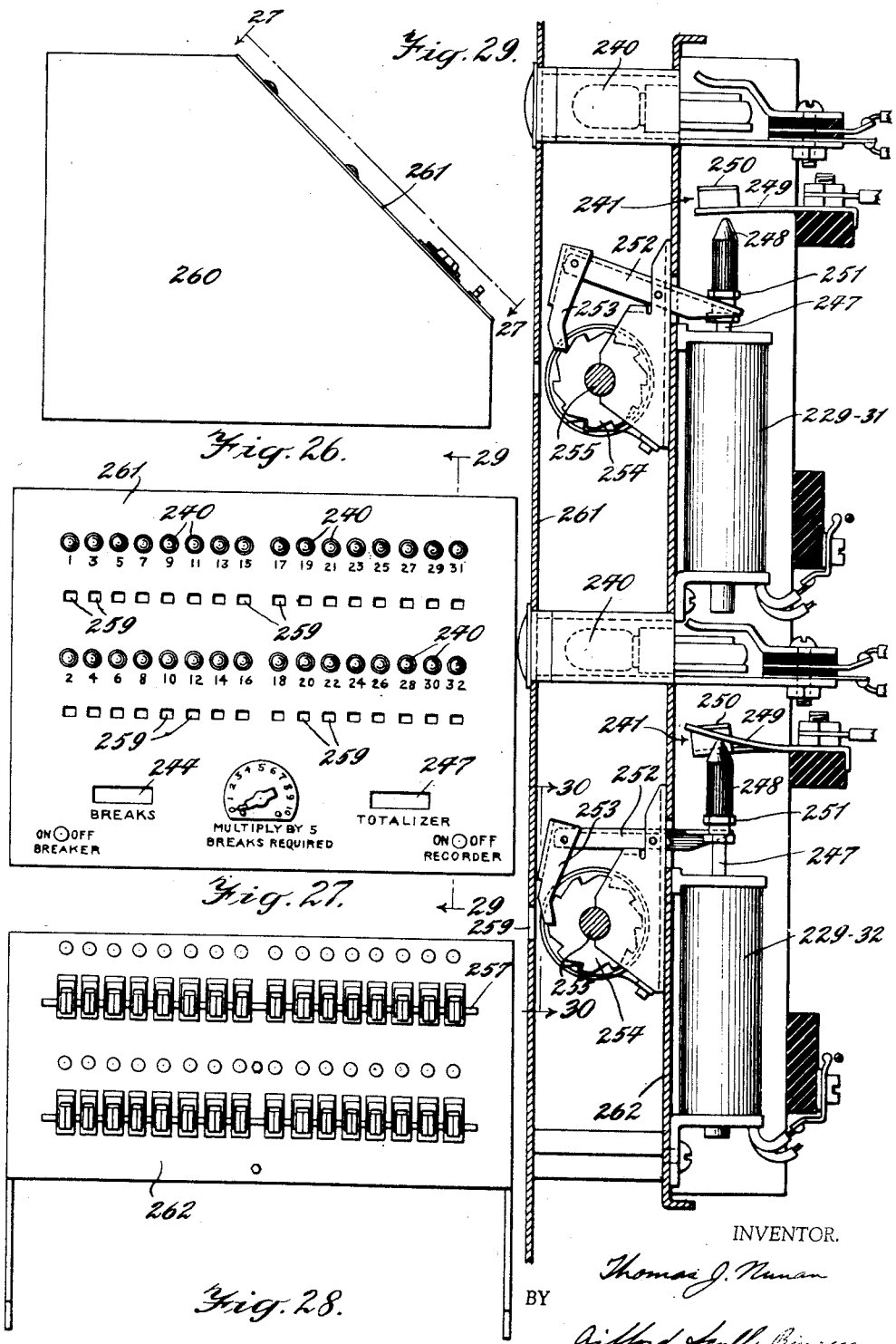
INVENTOR.
Thomas J. Nunan
BY
Gifford, Scull & Burgess
ATTORNEYS.

Jan. 3, 1939.  T. J. NUNAN  2,142,251
THREAD TESTING DEVICE
Filed March 5, 1935  15 Sheets-Sheet 15

INVENTOR.
Thomas J. Nunan
BY
Gifford, Scull & Burgess
ATTORNEYS.

Patented Jan. 3, 1939

2,142,251

UNITED STATES PATENT OFFICE 2,142,251

THREAD TESTING DEVICE

Thomas J. Nunan, Summit, N. J., assignor to The Clark Thread Company, Newark, N. J., a corporation of New Jersey Application March 5, 1935, Serial No. 9,428

28 Claims. (Cl. 73—51)

This invention relates to a novel and improved form of thread testing device. One of the principal objects of the invention is to provide a device of this character which shall accurately make the desired measurements and record them. The novel features making possible this object and other objects will be better understood from the following description and the annexed drawings, in which I have shown selected embodiments of the invention and in which:—

Fig. 2 is a view on an enlarged scale taken on the same plane as Fig. 1 and showing more of the details of construction;

Fig. 3 is a sectional view taken approximately on the line 3—3 of Fig. 2;

Fig. 4 is a view on an enlarged scale likewise taken on the same plane as Fig. 1 but with certain parts removed so as to show details of construction;

Fig. 5 is a view taken from the right of Fig. 4 showing the structure appearing in that figure, parts here also being broken away, better to show certain details;

Fig. 6 is a view taken approximately on the line 6—6 of Fig. 3, but with the back of the casing removed and with parts being broken away to show details of construction;

Fig. 7 is a partly sectional view on an enlarged scale taken approximately on the line 7—7 of Fig. 5;

Fig. 8 is a section approximately on the line 8—8 of Fig. 7;

Fig. 9 is a view approximately on the line 9—9 of Fig. 8;

Fig. 10 is a view also on an enlarged scale taken approximately on the line 10—10 of Fig. 2;

Fig. 11 is a view on an enlarged scale taken approximately on the line 11—11 of Fig. 2;

Fig. 12 is a fragmentary view corresponding to Fig. 1, but showing certain of the parts in different positions;

Fig. 13 is a view of a fragmentary portion of Fig. 12 illustrating the operation of the parts shown therein;

Fig. 14 is a face view of a fragment of the record strip printed by operation of the device;

Fig. 15 is a side elevation, partly in section, of a recorder and the operating mechanism therefor;

Fig. 16 is a plan view of the structure appearing in Fig. 15 but with the casing top removed and certain parts shown in section;

Fig. 17 is a view taken on the same plane as Fig. 15 but showing a different form of operating mechanism for the recorder;

Fig. 18 is a view of the structure of Fig. 17 as seen from the left of that figure;

Fig. 19 is a top view of the structure appearing in Fig. 18;

Figure 30:
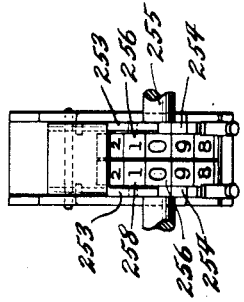
Figure 32:
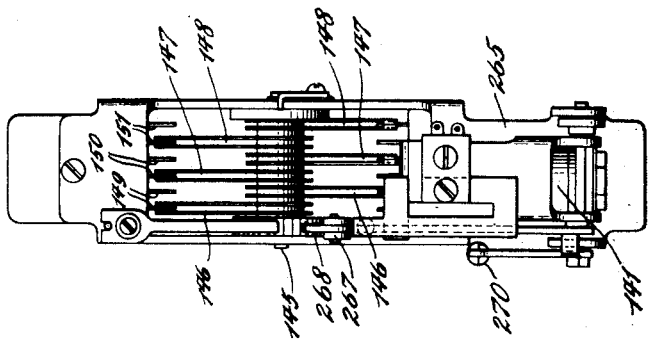
Figure 31:
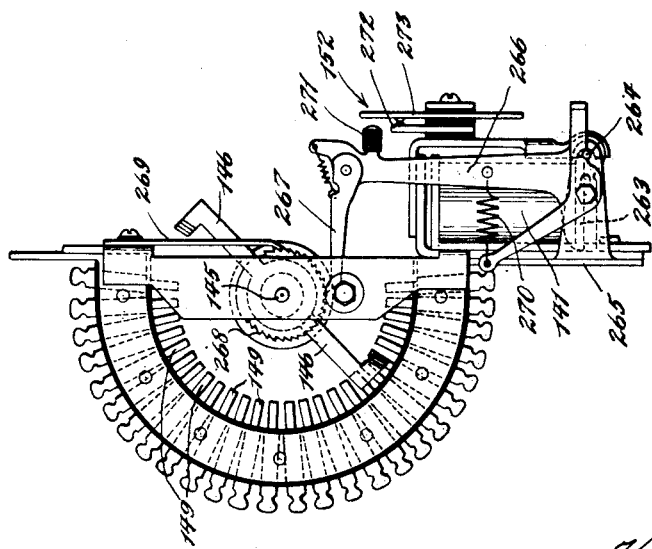

Figs. 20—A and 20—B together form a wiring diagram illustrating one means by which the device may operate;

Fig. 21 is a view corresponding generally to Fig. 4 but showing different embodiments of certain parts of the invention;

Fig. 22 is a view substantially on the line 22—22 of Fig. 21, parts being shown in section;

Figs. 22—A and 22—B are diagrams showing certain of the parts shown in Fig. 22 but in different positions;

Fig. 23 is a detail sectional view approximately on the line 23—23 of Fig. 21;

Fig. 24 is a wiring diagram illustrating the operation of the embodiment shown in Figs. 21, 22, 22—A, 22—B, and 23, and showing how that embodiment can be used in connection with the wiring diagram of Figs. 20—A and 20—B;

Fig. 25 is a wiring diagram of another manner of operating the device and which may be used in place of the wiring diagram of Figs. 20—A and 20—B;

Fig. 26 is an end view of a recorder which may be used with the wiring diagram of Fig. 25;

Fig. 27 is a view of the face of the recorder, this view being taken on the line 27—27 of Fig. 26;

Fig. 28 is a view looking in the same direction as Fig. 27 but with the front or top cover or panel of the cabinet removed;

Fig. 29 is a sectional view on a greatly enlarged scale approximately on the line 29—29 of Fig. 27;

Fig. 30 is a view substantially on the line 30—30 of Fig. 29, which is also approximately the plane upon which Fig. 28 is taken;

Fig. 31 is a view showing the construction of one of the rotary switches which appear in the various wiring diagrams;

Fig. 32 is a view of the switch appearing in Fig. 31 as seen from the right of that figure.

I have shown the invention as embodied in a device for testing thread to the breaking point, although certain features of the invention may be found to have application to other uses. I shall first describe the operation of the device and then elaborate on various details thereof.

Figure 1:
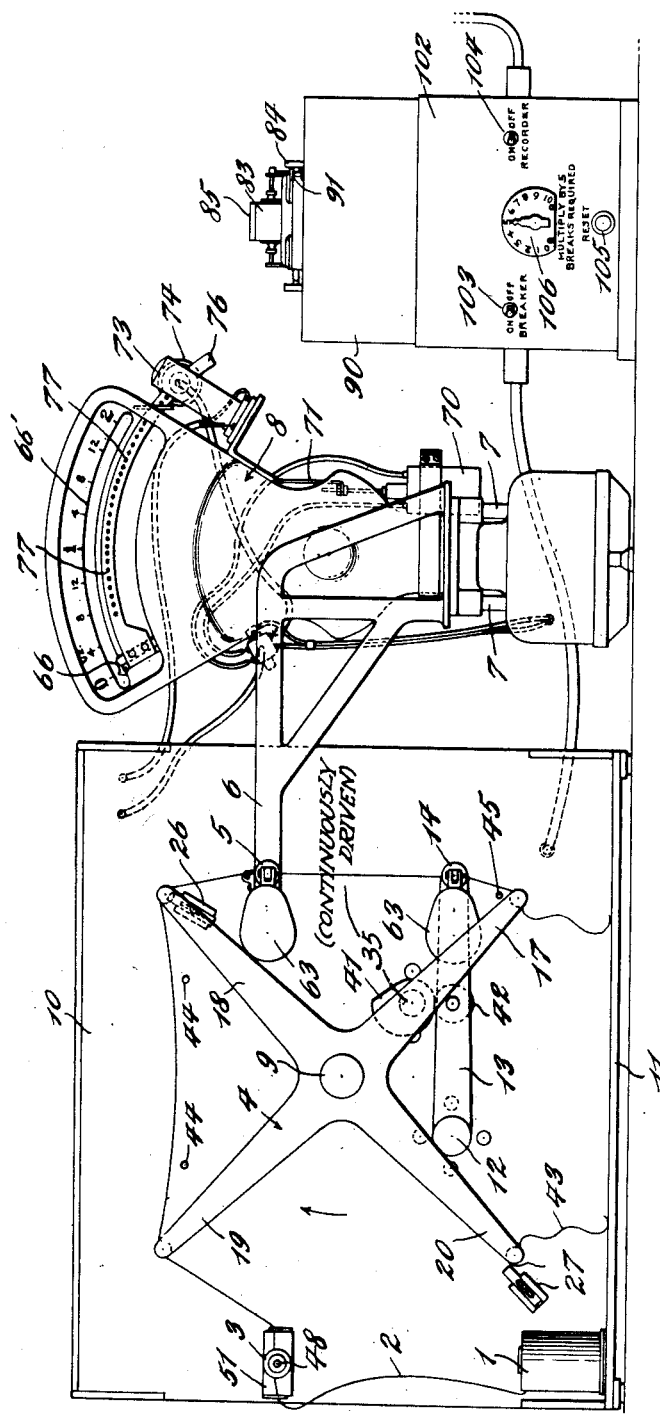
Fig. 1 is a vertical face view of one of the selected embodiments.

Referring first to Fig. 1, I have shown therein a thread cylinder 1 forming a source of supply for thread to be tested and from which the thread 2 passes through a tension device 3 of any suitable construction and is then carried by a rotary frame 4 to a clamp 5 supported upon a bracket 6 secured to a movable part 7 of a scale 8. The scale is selected as a suitable form of indicator or measuring instrument and may be of any of the well-known forms which may be found suitable for the purpose. Therefore the details of the scale mechanism will not be described except as they are of interest in understanding the invention. The indicating part of the measuring instrument may be omitted entirely for some purposes, and therefore the word "indicator" is used merely for convenience of expression.

For the purpose of convenience I shall refer to the clamp 5 as the indicator clamp, since it moves with the indicator.

The frame 4 is rotatably mounted about its axis 9 on a suitable support 10, here shown in the form of a panel extending upwardly from a base 11, and is operated in a clockwise direction, as viewed in Fig. 1. The operating means will be more fully described presently.

Rotatably mounted upon the panel 10 is a rock shaft 12 having on the front of the panel a lever 13 secured thereto, and upon the outer end of this lever is a clamp 14 which, for the sake of convenience, I shall refer to as the breaking clamp. As best shown in Figs. 2 and 6, on the back of the panel 10 the rock shaft 12 has an arm 15 which is urged towards the base 11 by means of a spring 16.

By means to be described later, the clamps 5 and 14 are periodically operated in synchronism with the movement of the lever 13 and the frame 4. The frame 4, as indicated, comprises a plurality of arms, here shown as four in number and which I have designated as 17, 18, 19, and 20, and is given an intermittent rotation in the direction indicated by the arrows in Figs. 1, 2, and 12.

On the end of each of the arms 17, 18, 19, and 20 is a feed clamp, the construction of which is best shown in Fig. 10. Here the clamp is shown as formed of two jaws, one jaw 21 being stationary and secured to the end of a horizontally extending tubular finger 22. The other jaw 23 is movable and is mounted upon a plunger 24 slidably mounted in the tubular finger 22 and normally urged towards the left of Fig. 10 by means of a light spring 25 which engages between the end of the tubular finger and an abutment on the plunger.

The strength of the spring 25 is such that the jaws 21 and 23 will yieldingly clamp a thread between them with sufficient force to pull the thread from the source of supply 1.

It will be seen that the jaws flare outwardly from each other towards their peripheries in order to receive the thread and also in order to permit forcing of the jaws apart at certain points. This forcing apart may be done by a release member 26 or 27 (Figs. 1 and 2) of identical construction, and details of which are better shown in Figs. 7 and 10. It will be seen that each release member comprises a wedge 28 slidably mounted on a block 29 secured to the panel 10 and held in adjusted position by means of a screw 30 received in a slot 31. The wedge moves in suitable guideways on the block, as indicated.

The intermittent motion of the frame may be caused by any suitable means, here exemplified by a Geneva cross 32 mounted upon the shaft 9 on the back of the panel 10 and operated by a pin 33 on an arm 34 secured to a shaft 35. Associated with the arm 34 is the usual disk 36 engaging the arcuate portions of the cross to hold it against movement when the pin 33 is not operating. Of course, other suitable types of intermittent movements may be used.

The shaft 35 is rotated from a motor 37 which, through a gearing train contained in a gear box 38, rotates a pinion 39 meshing with a gear 40 secured to the shaft 35. The shaft 35 forms a cam shaft extending through the panel 10 in which it is supported by suitable bearings, and on the front end thereof it carries a cam 41 engaging a cam roller 42 upon the lever 13.

Assuming that the parts are in the positions shown in Figs. 1 and 2, the thread is carried from the source of supply 1 through the tension device 3 over the clamps on the arms 19 and 18 and through the clamps 5 and 14. The clamp on the arm 19 will be closed so that the thread will run freely over that clamp, the jaws thereof forming a guide for the thread. The jaws of the clamp on the arm 18 will be held open by the release member 26 so that while the thread may still run freely between those jaws, nevertheless when the jaws are closed the thread will be held therebetween.

The end of the thread below the clamp 14 will be inserted between the jaws of the clamp on the arm 17 so as to be held to that arm.

The motor 37 can now be put in operation and the shaft 35 will be rotated, causing the cam 41 to rotate in a counterclockwise direction as seen in Figs. 1, 2, and 12, and depress the lever 13. As the lever 13 moves downwardly, it will carry with it the clamp 14 and the thread held therein. The thread will exert a tension upon the clamp 5 and thus upon the bracket 6, and will actuate the indicator exemplified by the scale. The cam 41 is so designed as to insure that the thread will break between the clamps 5 and 14 while the frame 4 is still stationary and before the pin 33 engages the Geneva cross. The approximate positions which the parts will now occupy are indicated in Fig. 12.

After the thread is thus broken, the frame will be rotated by the intermittent movement, it being noted that the arm 34 and cam 41 are so positioned on the cam shaft 35 that the frame is held stationary during depression of the lever 13 by the cam 41. The clamps 5 and 14 are released by means to be described later, and then the frame 4 will be rotated in the direction of the arrows indicated in Figs. 1 and 2. This rotation of the frame will cause the feed clamp on the end of the arm 18 to move away from the release member 26 so that the jaws 21 and 23 of that clamp will come together and hold the thread therebetween. The thread will still be loosely received between the jaws of the feed clamp on the end of the arm 19, and as the frame rotates the thread will be pulled down between the jaws of the clamps 5 and 14 which are now open and the arm 20 will move upwardly to the position shown as occupied by the arm 19. The arm 19 will occupy the position shown as occupied by the arm 18, and as it reaches that position, the feed clamp on the end thereof will be opened by the release 26. The arm 18 with the thread secured thereto will have moved down to the position shown as occupied by the arm 17, and it will thus be seen that the thread is carried through the jaws of the clamps 5 and 14 by a single feed clamp on the end of one of the trode arrangement for a cathode ray commutator in which a larger power than that given by the arrangement of Fig. 2 can be obtained.

In Fig. 4, a cathode ray tube has a first cathode 35 which is in the form of a short filament running at right angles to the plane of the paper. This cathode is heated by current from a battery 36. Next to the cathode 35 is a modulating grid 37 and then a magnetic focusing coil 38, which is designed to project a line image of the cathode on the grid 39, in close proximity to which is placed a collecting electrode 34. The arrangement and function of this part of the apparatus will be described more fully later. A pair of deflecting plates 40, 41, are provided for deflecting the electron beam from the cathode 35 over the grid 39. A second cathode 42 is arranged on the side of the grid 39 nearest the cathode 35, and to one side of the path of the electrons from the first cathode 35, so that these electrons pass it, and fall on one side of the grid 39. The cathode 42 is heated by a battery 46. On the side of the grid 39 remote from the cathodes is placed a modulating grid 43, then a magnetic focusing coil 44, and finally a contact assembly 45, the contacts on which may be connected by wires to the electrodes of the cell, as described with reference to Figs. 1 and 2, or may be attached to the cell as described with reference to Fig. 3.

The construction of the grid 39 and the relative positions of this grid, the electrode 34 and the cathode 42 are shown in Figs. 5 and 6. The grid 39 comprises two supporting uprights 56 and 57, the upright 57 being made of, or being coated with a layer of resistive material. The connection to the outside of the tube is made by a metal conducting strip 58. The grid consists of a number of small grids 59 arranged side by side spaced apart from one another, and connected to the resistive element 57. The number of grids 59 is made equal to the number of elements it is desired to reproduce in a picture line, that is equal to the number of crystals of the modulating cell 4 of Fig. 1. The position of the cathode 42 relative to the grid 39 is shown in dotted lines in Fig. 5, and as a full line in Fig. 6, and the beam from the cathode 35 falls on the grids 59 on that part of them which is between the cathode 42 and the support 56. The electrode 34 consists of two plates (which are suitably connected together electrically) arranged one on each side of the beam from the cathode 35, and held at a high potential relative to the grid 39, which is biassed negatively relatively to the cathode 42. The connections of these electrodes to the battery 55 are shown in Fig. 4. Preferably a shielding electrode 60 connected to the cathode 42 is provided between the latter and the collecting electrode 34. The bias on the grid 39 is such that no emission from the cathode 42 passes it.

The operation of the cathode ray tube is as follows. Television signals received by the aerial 47 are amplified by an amplifier 48, and applied to a separating arrangement 49 which separates the picture signals, line synchronising signals and frame synchronising signals from each other. The frame synchronising signals appear at 50 and are used to control the slow speed scanner 7 of Fig. 1. The line synchronising signals appearing at 51 are fed to a time base circuit 52 to control the generation of saw tooth impulses at line frequency which are fed to the deflecting plates 40, 41. The picture signals appear at 53 and are fed through a condenser 54 to the modulating grid 37, which is biassed negatively with respect to the cathode 35 by connecting it to the negative terminal of a source of voltage 55, and connecting the centre tapping of the battery 36 to a more positive tapping on the source 55. In this way the beam falling on the grid 39 will be modulated with the received picture signals.

Now when the beam falls on one of the grids 59, this grid emits secondary electrons, and it is arranged by suitably choosing the potential difference between the cathode 35 and grid 39, and by making that part of the grid 59 of suitable material (e. g. by coating it with a substance which readily emits secondary electrons) that the number of secondary electrons emitted exceeds the incident electrons. There will be produced on the grid 59 in question a positive charge proportional to the strength of the beam falling thereon, which is in turn proportional to the brightness of the corresponding picture element. The resulting decrease in negative bias of the grid 59 will result in a flow of electrons from the cathode 42 through the grid 59. This electron current passes through the grid 43 (Fig. 4) on which is impressed a high frequency oscillation of the frequency required for driving the crystals of the light modulating device. This frequency is generated by an oscillator 61 and fed to the grid 43 through a transformer 62. The focussing coil focusses an electron image of the grid 39 on to the contact assembly 45, the image of each grid 59 in the grid 39 being imaged on one contact. Thus each contact will have falling on it a beam of electrons which is modulated in amplitude by the picture signal corresponding to it and by the high frequency oscillation from the generator 61, and a corresponding train of waves will be set up in the cell and used as described with reference to Fig. 1. When the beam from the cathode 35 moves off one grid 59 on to the next one, the charge on the first grid will begin to leak away through the resistive support 57, the resistance being such that the charge received from the beam from the cathode 35 has substantially entirely leaked away within one line period. It will be seen that the above apparatus provides a certain storage effect, since a modulated oscillation continues to be applied to each contact after the beam has moved away from the corresponding grid, due to the time required for the charge to leak away from the grid.

It has been observed that if a quartz piezoelectric crystal has only a part of its surface covered with the electrodes, and an oscillation is applied thereto, only the part of the crystal covered with the electrodes will vibrate, the remainder being unaffected.

The present invention therefore provides a modification of the arrangements previously described, in which the crystal assembly is replaced by a single crystal extending over the whole length of the cell. In one example, illustrated in Fig. 7, the crystal 80 is covered on the side remote from the liquid by a number of separate electrodes 81. These electrodes may be formed of fine wires, and the spaces between them may be filled with an insulating material. On the other side of the crystal 80 is fixed a common electrode 82, for example a steel plate.

In an alternative arrangement using the above stated fact, the crystal surface is itself exposed to the cathode ray beam in place of the capacity connection shown in Fig. 3. In this case the focussing system of the tube, which may be a cylindrical focussing system, preferably causes the beam to fall on a narrow strip of the crystal taken at right angles to the longer dimension of the latter.

In any of the embodiments of the invention described above, the distance between the crystal or crystals and the opposite wall of the cell can be made such that the wave reflected from this wall produces standing waves with the waves from the crystal. By utilising the reflection of the waves to and fro across the cell, the effect of the waves may be made to persist for some time after the scanning cathode ray beam has passed on to another part of the crystal or crystal assembly, thereby giving an enhancement of the light passing through to the screen.

The cell wall may be fitted with a special reflecting surface as shown in Fig. 8. The reflector can be made from, for example, a polished plane metal surface 83, which may be of stainless steel. The distance of the reflector from the crystals 84 is made very short to achieve a multiple reflection. In this way, the short excitation of the supersonic waves in the liquid is prolonged for the whole duration time of a line. It is also an advantage to apply only a low damping to the crystal to obtain in this way a persistance of the oscillations, for example by exciting it with a frequency which is a harmonic of the natural frequency of oscillation of the crystal itself. The width of the resonance band may be, for instance 100 kilocycles instead of the usual 2 megacycles.

It will be noticed that in any arrangement of the present invention the waves are not travelling along the cell parallel to the direction of line scanning as in the case of the device according to British Patent specification No. 439,236. In that arrangement, owing to the necessity for the light beam to be parallel in the direction of movement of the waves, the major restriction of the size of the light source and its aperture is in the line scanning direction. In the present invention there is no restriction in this direction, with consequent increase in light. The only restriction is in the direction at right angles to this, where in both cases there is a restriction owing to the necessity of forming a narrow image on the screen, and owing to the necessity for keeping the width of the low speed scanning member reasonably small. For example, the present invention makes it possible to use a cinema arc lamp with a large arc crater, and full use of the light available from which such a source can be made.

The piezo-electric crystal assembly may be made from a large number of small crystals stuck on a steel plate, acting as one electrode, and having on the other side the separate electrodes for the generation of the separate wave-trains. Such an assembly acts in a similar way to the arrangements previously described.

I claim:

1. A television receiver comprising, in combination, a cathode ray tube having an electron gun for producing a beam of electrons and an electrode system for modulating said beam with received picture signals and with a high frequency electrical oscillation, a light modulating device of the kind utilising the diffraction effect on light of high frequency mechanical waves in a liquid medium, said light modulating device comprising a plurality of generators equal in number to the number of elemental areas in the picture line for generating a plurality of parallel trains of high frequency mechanical waves in said liquid medium, said light modulating device being arranged in the path of said beam of electrons so that said beam scans said generators at line frequency to cause them to produce said trains of waves in said liquid medium, and an optical system for forming an optical diffraction image of said trains of waves to reconstitute a picture line on a receiving screen, and frame scanning means for sweeping said image over said screen.

2. A television receiver according to claim 1 wherein said generators comprise a piezo-electric crystal assembly having a plurality of electrodes arranged on the side thereof remote from said liquid medium a plurality of contacts arranged within said cathode ray tube and in close proximity to said electrodes, whereby voltages induced on said contacts by said beam of electrons are transmitted to said electrodes by virtue of the capacity existing between said contacts and said electrodes.

3. In combination in a television receiver, means for producing a picture line comprising a supersonic wave light modulating device in which there are provided a plurality of generators of mechanical waves equal in number to the number of elements it is desired to reproduce in a line of the received picture, cathode ray tube commutating means for relegating to each generator a high frequency oscillation modulated with that part of the picture signal in each line apportionate thereto, and an optical system for producing from light diffracted by said trains of waves a picture line on a screen.

4. A television receiver comprising a light modulating device of the kind utilizing the diffraction effect on light of high frequency mechanical waves in a liquid medium and comprising a plurality of similar generators for generating a plurality of trains of high frequency mechanical waves in said liquid medium, each train corresponding to an elemental picture area of a picture line, electronic line-scanning means for exciting said generators one after the other with an electron stream modulated in intensity in accordance with received picture signals and interrupted at a high frequency suitable for exciting said generators, optical means for forming an optical diffraction image of said trains of waves on a receiving screen, and mechanical frame scanning means for sweeping said image in a direction at right angles to its length over said screen to produce the frame scanning component and thus reconstitute a received picture.

5. A television receiver comprising a light modulating device of the kind utilizing the diffraction effect on light of high frequency mechanical waves in a liquid medium and comprising a plurality of similar generators for generating a plurality of trains of high frequency mechanical waves in said liquid medium, each train corresponding to an elemental picture area of a picture line, a cathode ray tube having an electron gun for producing a beam of electrons, means for modulating said beam with received picture signals and also with high frequency suitable for exciting said generators, a plurality of contacts, each of said contacts being associated with one of the said generators through an alternating current path, and means for deflecting said modulated beam of electrons over said contacts at line frequency, optical means for forming an optical diffraction image of said trains of waves on a receiving screen, and mechanical frame scanning means for sweeping said image in a direction at right angles to its length over said screen to produce the frame Electric current may be supplied to the device from any suitable source, here indicated in Fig. 20—B as two line conductors 108 and 109 carrying a 110 volt, 60 cycle, alternating current. The conductors 108 and 109 lead to the opposite sides of the motor 37, the conductor 108 having therein a switch 110 operated by a solenoid 111, the switch and solenoid together forming what for convenience may be referred to as the "trip relay". The function of this trip relay will be more fully discussed later.

The solenoids 63 are connected by conductors 112 and 113 to the conductors 108 and 109, respectively, and lead through the primary of a transformer 114, the secondary of which is connected through a rectifier 115 with the solenoids 63, these solenoids being arranged in parallel with each other through variable resistances, if such are desired. The purpose of the rectifier is to provide a one-way current through the solenoids, as will be apparent to those skilled in the art.

In the conductor 112 is shown the cam-operated switch 95, which switch thus controls the operation of the solenoids, and it will be seen that this operation is also controlled by means of the "breaker switch" 103 shown as located in the conductor 109.

The lamp 74 is likewise connected, by means of the conductors 116 and 117, to the conductors 108 and 109 and lead therefrom to the primary of a transformer 118, the secondary of which is connected to the lamp 74 by the conductors 119 and 120. It will be seen that the cut-off switch 99 shown located on the scale in Fig. 5 is indicated in the conductor 119, and therefore this switch controls the operation of the lamp.

Likewise connected to the conductors 108 and 109 is the photo-electric cell 73. This connection may be made by the conductor 121 connected to the conductor 116 and thus to the conductor 108, the conductor 121 leading to the amplifier 122. This amplifier is of known construction, and one form which I have found suitable for the present purpose is sold under the name of "Westinghouse type LE amplifier". The other line conductor 109 may be connected to the other side of the amplifier 122 by means of the conductor 123. From the amplifier 122 lead two input leads 124 and 125 to opposite sides of the cell 73. The "recorder switch" 104 is shown as being located in the conductor 123 and thus this switch controls the amplifier and through the amplifier controls the operation of the photo-electric cell, as well as of other elements to be described later.

The ratchet solenoid 70 may be connected through the conductor 116 connected to one of the line conductors 108, part of the conductor 121, conductor 126, switch 127, conductor 128, rectifier 129, conductor 130, to one side of the solenoid. The other side of the solenoid 70 may be connected to the line conductor 109 through the conductor 131, rectifier 129, switch 104, and conductor 123. It will be noted that the switch 96 is located in the conductor 131.

It will thus be seen that the ratchet solenoid, photo-electric cell, lamp, motor, and clamp solenoids are all connected across the line formed by the conductors 108 and 109.

By the conductors 116, 121, 126, 128, 123, and switch 104, the rectifier 129 is likewise connected across the same line. This rectifier has the function, known in the art, of giving the effect of a one-way current, and in the arrangement illustrated it is used to supply current to substantially all the recording apparatus.

Current through the rectifier, and consequently through the recording apparatus, is controlled by the "recorder switch" 104 and also by the switch 127, which in turn is controlled by the solenoid 132, this switch and solenoid forming the dash-pot relay or other time-delay relay.

The various relay switches and magnet-operated switches indicated are supplied with the usual springs tending to keep them open or closed, as the case may be.

Connected to the amplifier 122 and receiving an amplified current therefrom is a circuit including the conductors 133 and 134 connected to opposite sides of the magnet 135 controlling switches 136 and 137, this magnet and the switches together being constructed so as to be a quick-acting relay.

The switch 136 is in a circuit leading from one side of the rectifier 129 through the conductors 138 and 139 to one side of the switch, the conductor 140 leading from the switch to the magnet 141 forming part of a rotary switch 142, and the conductors 143 and 144 leading to the other side of the rectifier 129.

The rotary switch 142 will hereinafter be referred to for convenience as rotary switch No. 1. This switch and other rotary switches hereinafter referred to may be of the type shown in Figs. 31 and 32, and the construction of which will be more fully described later.

For the present it is sufficient to say that the switch 142 comprises a rotary shaft 145 upon which are secured the three wiping contacts or brushes 146, 147, and 148. In the diagram of Fig. 20—B, these three contacts are shown on separate centers but are connected together by dotted lines, to show that the centers are preferably coincident in practice. The wiping contact 146 wipes over homing contacts 149, while the wiping contacts 147 and 148 wipe over selector contacts 150 and 151, respectively.

The circuit closed by engagement of the wiping contact 146 with one of the contacts 149 includes the switch 152 operated by the magnet 141, the contacts 146 and 149, the conductor 153, the normally-closed switch 154, conductors 155, 156, and 138, leading to one side of the rectifier, while the other side of the rectifier is connected through the conductors 144 and 143 and magnet 141 to the switch 152.

The circuits closed by engagement of the wiping contacts 147 and 148 with the contacts 150 and 151, respectively, will be described later, as these circuits include apparatus which has not yet been described.

There is shown a plurality of relays referred to, respectively, as slow release relay No. 1, slow release relay No. 2, vibrating reed relay, slow release relay No. 3, and slow release relay No. 4. The circuits for these relays will now be described.

The magnet 157' operating the normally-open switch 157 of slow release relay No. 1, has current supplied to it on one side thereof by a conductor 158 leading through the switch 137 and the conductors 139 and 138 to one side of the rectifier 129, to the other side of which the magnet 156 is connected by means of conductors 144 and 143.

One side of the normally-open switch 157 is connected to one side of the rectifier 129 by means of the conductors 144, 143, and 159, while the other side of the switch 157 is connected to the other side of the rectifier by means of the conductor 160, magnet 161 of slow release relay No. 2, and conductors 162 and 138.

Slow release relay No. 2 comprises three switches, 163, 164, and 165. Of these three switches, 163 is normally closed and 164 is normally open, while 165 is normally in the position shown, closing one of two circuits, both of which will be more fully described later.

The magnet 166 of the vibrating reed relay has current supplied to one side thereof from one side of the rectifier 129 through the conductors 144, 143, 167, switch 164, and conductor 168, whereas the other side of the magnet is connected to the other side of the rectifier by means of the conductors 138, 156, and 169. The switch 170 of this relay is in the form of a reed which vibrates between two contacts, as plainly indicated.

The magnet 171 of slow release relay No. 3 and which operates the switches 154 and 197, has one side thereof connected to one side of the rectifier 129 by means of the conductor 172, switch 170, conductors 173, 143, and 144, whereas the other side of the magnet 171 is connected to the same rectifier by the conductors 174, 156, and 138.

The magnet 175 of slow release relay No. 4 has one side thereof connected to one side of the rectifier 129 by means of the conductor 176, switch 165, conductors 177, 162, and 138, whereas the other side of the magnet 175 is connected to the other side of the same rectifier by the conductor 178, switch 179, contacts 181 and 182, and conductors 183, 143, and 144.

The switch 179 is controlled by the magnet 180 and forms therewith part of rotary switch No. 2, which is generally similar to rotary switch No. 1, having not only the wiping contact 181 adapted to engage the homing contacts 182, but also having the wiping contact 184 mounted upon the same shaft 185 as is the contact 181, and adapted to engage any one of the energizing contacts 186.

Similarly, the switch identified as rotary switch No. 3 has two wiping contacts 187 and 188 mounted upon a common shaft 189, contact 187 being adapted to engage any one of the homing contacts 190 and contact 188 being adapted to engage any one of the trip contacts 191.

The magnet 180 of rotary switch No. 2 receives its current from the rectifier 129 through the conductors 138, 162, 177, switch 165, and conductor 192 (or conductor 176 and switch 175') and conductor 193 leading to one side of the magnet, the other side being connected by the conductors 194, 183, 143, and 144 to the other side of the rectifier 129.

Current may be supplied from the rectifier 129 through conductors 144, 143, and 183 and contact 184 to any one of the electric contacts 186 and thence through one of the solenoids 92 and one of the contacts 150 and 147, or 151 and 148, as the case may be, to the conductor 195 and thence through the switch 163, conductor 196, switch 197, conductors 198, 156, and 138 back to the other side of the rectifier 129.

The magnet 199 of rotary switch No. 3 has one side thereof supplied with current from one side of the rectifier 129 through conductors 138, 156, and 201, whereas the other side of the magnet 199 is connected by the conductor 200 to the contact 186—M and thence through the contact 184, and conductors 183, 143, and 144 to the other side of the rectifier 129.

It should be noted that the solenoid 92—M is not connected to rotary switch No. 1, like the other solenoids 92, but is in a circuit comprising conductors 144, 143, 183, contacts 184 and 186—M, and conductors 202, 162, and 138.

Rotary switch No. 3, like the other rotary switches, has associated with its magnet 199 a switch 203 controlled by that magnet and permitting current to pass from one side of the switch through conductor 203', magnet 199, conductor 201, and conductors 156 and 138, to one side of the rectifier, whereas current from the other side of the switch 203 may pass through the contact 187, one of the homing contacts 190, the switch 105, and conductors 204, 143, and 144, to the other side of the rectifier 129.

Current from the line conductor 108 may pass through the conductor 205 to the conductor 188 and thence through one of the trip contacts 191, through one of the conductors 206 to one of the contacts 207 adapted to be engaged by the contact on the pointer 107 of the hand-operated switch 106 and thence through a conductor 208 and through the trip relay 111 to the other line conductor 109.

In operation, the thread is brought into position to be engaged by the two clamps 5 and 14 and is held by the feed clamp on the end of the arm 17 as in Fig. 1, being loosely engaged with the feed clamps on the arms 18 and 19 as previously described.

The pointer on the switch 106 which normally occupies the zero position shown in dotted lines in Fig. 20—B, is now set at the point desired. In the illustrated embodiment, I have assumed that it is desired to break the thread twenty-five times, and therefore I have set the pointer at 5 as indicated in Fig. 1 and in full lines in Fig. 20—B.

Normally, when idle the cam-operated switch 95 will be open and the switch 96 will be closed. However, as seen from Fig. 6, as soon as any substantial rotation of the cam shaft 35 takes place in the direction of the arrow appearing in that figure, the switch 95 will be closed so as to operate the solenoids 63 and cause the jaws of the clamps 5 and 14 to operate to grip the thread. At the same time, the switch 96 will be opened and remain open until near the end of the operation.

The cut-off switch 99 likewise will be open at the beginning of the operation so that the lamp 74 will not be lighted, but a relatively slight movement of the beam 100 of the scale will cause the switch 99 to close.

The breaker switch 103 may now be closed, thus completing the circuits through the motor 37, through the solenoids 63, and also through the lamp 74, except for the switches 95 and 99, which will be closed as soon as the motor has caused a small movement of the cam shaft 35.

The recorder switch 104 may be closed simultaneously with the switch 103, which will complete the circuit through the amplifier 122 to the photo-electric cell 73. Closing of this switch 104 will likewise energize the solenoid 132 of the dash-pot relay to close the switch 127 in the circuit of the rectifier 129, but the dash-pot will delay closing of the switch 127 for a sufficient time to permit the tubes of the amplifier 122 to become sufficiently warm to function, although the dash-pot relay may be omitted, if desired. As soon as the switch 127 does close, however, current will be available for the automatic operation of all of the apparatus and circuits described above.

With the closing of the switch 103, the motor 37 will start operation, and one of the first results will be the closing of the switch 95 by rotation of the cam shaft 35, to cause the solenoids 63 to operate the clamps 5 and 14 to grip the thread. The switch 96 will be opened by this same movement, as noted above. Another result of the rotation of the cam shaft 35 is to operate the cam 41 and depress the lever 13, thus causing the thread to break between the clamps 5 and 14. As previously described, this action will cause an actuation of the indicator and a consequent movement of the shutter 76 between the cell 73 and lamp 74.

The passage of each hole 77 in the shutter 76 will cause an impulse to be sent through the conductors 133 and 134 to the magnet 135 of the quick-acting relay of which that magnet forms a part, closing both of the switches 136 and 137. Closing of the switch 136 energizes the magnet 141 of rotary switch No. 1, and thereby causes the wiping contacts 146, 147, and 148 to move one step or into engagement with the next one of the contacts 149, 150, and 151, respectively, after which the switches 136 and 137 will be opened by the action of the relay. The operation of a rotary switch one step for each impulse is an action well known in the electrical art, but will be more fully described later in connection with the description of Figs. 31 and 32.

Since the holes 77 in the shutter are spaced apart a distance corresponding to units of weight, here taken as ounces, it will be seen that for each ounce of force applied and indicated on the scale, one hole will pass the light and thus one impulse will be given to the movement of the rotary switch.

The quick-acting relay is constructed with the usual spring, which will cause the switch 136 to open immediately after one hole has passed the light, it being understood that with the passage of a hole, the resistance of the cell will change enough to affect the amount of current passing through the relay sufficiently to permit the relay spring to act.

Normally, the switches 157, 164, 175', and 197 are open while the switches 163 and 154 are closed, and the switch 165 is in the position shown, connecting the conductors 176 and 177. In each instance, as noted above, the switch may be operated against the action of a spring tending to keep it in its normal position.

Closing of the switch 137 simultaneously with the switch 136 energizes slow release relay No. 1 to close switch 157, closing of which in turn will energize slow release relay No. 2 to close the switch 164, to open switch 163, and to operate the switch 165 to disconnect conductors 176 and 177 and to connect conductors 177 and 192. Closing of the switch 164 will energize the vibrating reed relay, whereas the described operation of the switch 165 will deenergize slow release relay No. 4, thus closing switch 175' through its spring and operating rotary switch No. 2 by current now available through switch 165.

Energizing of the vibrating reed relay will in turn energize slow release relay No. 3 which will open the switch 154 and thus break the circuit through the homing contacts 149 and wiping contact 146, in the circuit of which the switch 154 is located, as previously described.

The two rotary switches Nos. 1 and 2 will operate simultaneously under the action of the first impulse received, but the action of the slow release relay No. 4 holds the wipers 181 and 184 on the first contact 182 and 186, respectively, while the rotary switch continues to step the wiping contacts 146, 147, and 148.

These wiping contacts 146, 147, and 148 will continue to step around until the thread breaks and will move one step or one contact 149, 150, and 151, respectively, for each impulse received by the quick-acting relay. While this movement of the wiping contacts is taking place, all of the slow release relays No. 1, No. 2, No. 3, No. 4, and the vibrating reed relay will have remained energized, because of their slow-release feature, and thus prevent further movement of the rotary switch No. 2.

For the sake of example, assume that ten impulses have been transmitted to rotary switch No. 1. Then it will be seen that the three wiping contacts 146, 147, and 148 have moved to their positions shown in dotted lines. In this connection, these wiping contacts are shown at zero positions in full lines, and it will be noted that in those positions each of the wiping contacts is in a dead or idle position. It will also be noted that when contact 146 engages with any one of the contacts 149 except the "zero" one, a circuit will be closed at that point.

It will also be noted that the wiping contact 184 is in engagement with a blank contact 186 as the result of the first impulse.

Rotary switch No. 1 acts as a selector switch to select and partially close a circuit through one or more of the solenoids 92. For example, with the number 10 to be recorded, as is assumed to be the case, then the selector switch has selected and partially closed circuits through the solenoids 92—1 and 92—0. The wiping contact 147 will have moved to the position shown in dotted lines, where it rests upon the tenth contact 150. Similarly, the wiping contact 148 has moved a corresponding amount and over a corresponding number of contacts 151, but these contacts are all dead or blank except the tenth one, which is connected to solenoid 92—0.

The nine contacts 150 following that marked 10 are all connected to the solenoid 92—1, so that for any figure between 10 and 20 this solenoid is selected by the wiping contact 147. At the same time it will be seen that the wiping contact 148, after passing the contact 151 indicated by the numeral 10, will select one of the solenoids 92—1a and 92—2, etc. Similarly, when the wiping contact 147 is engaging any one of the contacts 150 between the points marked 20 and 30, the wiping contact 148 will engage one of the contacts 151 between the points marked 20 and 30 so as to energize one of the solenoids 92—1a, 92—2a, 92—3, etc.

From the above it will be seen that for every number from 1 to 9, inclusive, it is possible to complete a circuit through one of the solenoids 92—1 to 92—9, inclusive, whereas for every number from 10 to 32, inclusive, two circuits may be completed through two different solenoids corresponding to the two digits in the number.

Rotary switch No. 2 may be termed the energizing switch, and completes the circuits through the solenoids selected by the selector switch, and which circuits have been partially completed by the selector switch. The complete circuit through one of the solenoids leads from one side of the rectifier 129 through the conductors 144, 143, 183, the contacts 184 and 186, the selected solenoid, one of the contacts 150 or 151 and thence to the wiping contact 147 or 148, as the case may be, to the conductor 195, switch 163, conductor 196, switch 197, conductors 198, 156, and 138. In the diagram, the principal part of this circuit is shown in heavy lines.

Now take the time when the wiping contacts 147 and 148 have come to rest so that the circuits through the various solenoids 92 have been selected, and the wiping contact 184 has moved one contact from the position indicated.

Slow release relay No. 1 will remain energized as long as impulses keep reaching it, but when those impulses cease, which occurs when the thread breaks, then this relay will cease to be energized and the switch 157 will open, thus in turn causing the deenergizing of slow release relay No. 2 and the vibrating reed relay.

Slow release relay No. 2, in dropping out, energizes slow release relay No. 4, causing the wiping contacts 181 and 184 to move in a clockwise direction around over the contacts 182 and 186, respectively, back to their normal position which is indicated in the diagram. In this movement, the wiping contact 184 will complete the circuits through the various solenoids 92 which have been selected by the selector switch. The movement of the wiping contact 184, however, is slowed up by slow release relay No. 4.

The switches operated by the magnets 175 and 180, respectively, will alternately energize and deenergize these two magnets so as thus to delay the action of rotary switch No. 2 or the energizing switch and thus insuring that the wiping contact 184 will have sufficiently long engagement with any of the contacts 186 which are in the selected circuits so that the solenoids 92 in those same circuits may be properly energized.

The vibrating reed relay will maintain slow release relay No. 3 energized until the above described action has taken place, so as to maintain the switch 197 closed and the switch 154 open. When the vibrating reed of the vibrating reed relay comes to a central position, then the slow release relay No. 3 is deenergized and the switch 197 opens and the switch 154 closes.

Opening of the switch 197 breaks the circuit of the selector switch, and closing of the switch 154 puts current on the contacts 149 and completes the circuit through the magnet 141, thus causing the wiping contact 146 to rotate step by step in a clockwise direction until it reaches the position shown in full lines in the diagram, which movement is generally termed "going home". This action will be more fully explained later. During this movement, of course, the wiping contacts 147 and 148 move with the wiping contact 146 until they too reach the full line positions indicated.

It will be noted that the numbered contacts 186, which are connected to the various solenoid circuits and therefore are "live", are spaced apart a substantial distance on the arc of contacts so as to insure that the contact 184 only closes one circuit at a time. It will also be seen that it is impossible for the wiping contact 184 to close two circuits to operate the same recording key.

For example, the recording key numbered 1 may be operated by either one of the two solenoids 92—1 or 92—1a, and it will be seen that the contacts 186 connected in the circuits of these two solenoids and numbered 1 and 1a respectively, are spaced apart widely on the arc of contacts 186. Thus if, for example, the recording key numbered 1 is to be actuated twice in succession to record the numeral 11, it will have time to operate once under the action of the solenoid 92—1 when energized by closing of its circuit at contacts 186—1, and then return to inoperative position before it is acted upon under the influence of the solenoid 92—1a, when energized by closing its circuit at contact 186—1a.

Now assuming that the thread has broken after a force of ten ounces has been applied to it. The breakage will not affect the operation of the motor which will continue to rotate the cam 41. The ratchet 68 will hold the pointer 66 in the position at which it was when the thread broke until released by the later action of the solenoid 70.

The wiping contact 184 will have moved over all of the contacts 186, as previously described, including the contacts 186—1 and 186—0, thus successively energizing the solenoids 92—1 and 92—0, to record the number 10 on the recorder.

The solenoid 92—M should be energized to print each recording, and for that purpose the circuit through that solenoid is closed by engagement of the wiping contact 184 with the contact 186—M, which is located so that the contact 184 may engage therewith only after having passed over all of the other live contacts. Energizing of the solenoid 92—M will cause one of the fingers 87 to operate the key 80, which will cause printing of the recorded figures upon the strip 83 and movement of the strip into position to present a blank space for printing of the next set of figures. This movement of the strip is effected by standard mechanism incorporated in the adding machine, as is well known.

The wiping contact 184, in passing over the contact 186—M, which is connected to the conductor 200, thus energizes rotary switch No. 3 momentarily and causes the wiping contacts 187 and 188 to move one step or one contact 190 and 191, respectively.

It will be seen that only every fifth contact 191 is connected to one of the conductors 206 so that every break of the thread causes the movement of the wiping contact 188 from one contact 191 to the next adjoining one, but engagement of the wiping contact 188 with the contact 191 acts as a switch to help in closing a circuit, only at every fifth or numbered contact 191. This is the reason why the pointer of the switch 106 is shown at a figure corresponding to the number of breaks desired, divided by five.

Movement of the wiping contact 187 over the homing contacts 190 will have no effect at this stage, but when the wiping contact 188 comes in contact with the contact 191—5, corresponding to the setting of the switch 106 in the selected example, a circuit will be completed through the conductor 205, contacts 188, 191—5, one of the conductors 206, the switch 106, conductor 208, and trip relay 111, which will open the switch 110 and stop the operation of the motor.

Before another set of tests takes place, the reset normally open switch 105 should be closed manually to close the circuit through the homing contacts and the magnet 199 and thus cause rotary switch No. 2 to return the contact 187 to initial position. This circuit comes from one side of the switch 203, through the contacts 187 and 190, switch 105, and conductors 204, 143, and 144, to one side of the rectifier, and from the other side of the switch 203, through conductor 203', magnet 199, and conductors 201, 156, and 138, to the other side of the rectifier.

After each break of the thread, until the motor is stopped, the cam shaft 35 continues its operation, causing successive breaks in successive lengths of thread fed into position to be broken. During the rotation of the cam shaft, the switches 95 and 96 are periodically opened and closed. Closing of the switch 96 takes place after the thread is broken, and will operate the ratchet solenoid and cause the ratchet 68 to release the pawl 67 to permit the pointer 66 to return to zero position before tension is placed upon another length of thread. This return is caused by the usual mechanism of the scale, which is of standard construction and need not be described or illustrated in detail.

When the operation of the motor is discontinued upon completion of the required number of test breaks, the key 80 may be actuated by the hand-operated stem 91 to totalize the figures.

The result of the above described operations is a printed or typed record on the strip 83, as shown in Fig. 14. The recorder selected for illustration is one in which the measurements themselves may be recorded in one column, as indicated, and in another column opposite each measurement is printed a numeral "1" to indicate one measurement. Operation of the totalizing mechanism of the recorder in the manner described above will result in providing two totals, one a total of the measurements and one a total of the number of measurements. In Fig. 14 the strip is a section of one in which the device was operated with the switch 106 set for ten breaks, and therefore ten measurements were recorded.

Referring now to Figs. 21, 22, 23, and 24, I have indicated therein a different embodiment of a certain part of the invention, more particularly the part relating to the sending of the impulses which actuate the recording mechanism.

I have found that for some types of testing apparatus where the units to be measured and recorded are relatively small, or where for any other reason the holes 77 in the shutter 76 are placed close together, and then a vibration occurs which will disturb the relation of the shutter to the lamp and cell, such vibration may cause the shutter to flutter enough to send impulses, by changing the quantity of light reaching the cell. The structure and arrangement shown in Figs. 21, 22, 23, and 24 is designed to obviate this difficulty.

The parts appearing in Figs. 21, 22, 23, and 24 which are identical with the parts already described have been given the same numerals and a description of their function will not be repeated.

Instead of the shutter 76 having a hole 77 for each ounce or other unit of force, I provide it in this embodiment with one hole for each two ounces, thereby cutting down the number of holes by half. Cooperating with the shutter, I provide two lamps 74a and 74b, connected in parallel, and these lamps are so spaced apart lengthwise of the shutter that when one lamp is shining through one of the holes 77, the other lamp has its beam of light directed against an opaque part of the shutter between two of the holes. In this instance, the center to center spacing of the lamps is 3/2 the center to center spacing of the holes.

Cooperating with each of the lamps is a photoelectric cell, 73a, 73b, respectively. By means that will be explained later, when the scale pointer 66 indicates zero, neither lamp 74a nor 74b will be lighted, nor in registry with one of the holes, but the end hole 77—1 is disposed between the beam of light from the two lamps, as plainly shown in Figs. 22 and 24.

Now as the pointer 66 moves from zero to 1 on the scale face 67, the light in both lamps is lighted, by means to be described later, and the next to the last hole 77—2 will come into registry with the beam of light from the lamp 74b, as shown in Fig. 22—A, and cause this beam to act upon the cell 73b. However, the end hole 77—1 will not have reached a position to register with the beam of light from the lamp 74a, as shown in Fig. 22—A.

Then, as the pointer moves to 2 upon the scale face, the end hole 77—1 will be brought to a position to register with the beam of light from the lamp 74a and the next hole 77—2 will pass out of registry with the beam from the lamp 74b, all as shown in Fig. 22—B. This operation will be repeated, first one hole coming into registry with one beam of light and then the other hole coming into registry with the other beam of light, either one lamp or the other acting upon its cell for each unit of measurement.

Each cell is placed in the input circuit 124a—125a or 124b—125b of an amplifier 122a or 122b, respectively. These amplifiers are connected in parallel to and receive current from the conductors 121 and 123, and they act in the same manner as the amplifier 122, which in the other embodiment is connected to the same conductors.

In the embodiment being described, instead of the switch 99 being used as shown in Fig. 5, I use a double switch indicated generally by the numeral 99' in Figs. 21, 23, and 24, and controlled by the position of the bracket 6. This switch comprises four spring contacts in what is known as a break-make assembly, these contacts being identified as 209, 210, 211, and 212. When the pointer 66 is at zero, the various contacts have the relation shown in Figs. 23 and 24, namely, the two contacts 209 and 210 are out of engagement with each other, and the contacts 211 and 212 are in engagement with each other, in which position they are held by the bracket, as shown.

Now as the bracket 6 is moved downwardly under the tension of the thread before it breaks, the contact 212 will move out of engagement with the contact 211, and the contact 209 is brought into engagement with the contact 210, the contacts 209 and 212 moving together under their spring actions and through the arrangement of insulating spacers 213, best shown in Fig. 23.

Therefore, as soon as tension on the thread is sufficient to move the bracket 6 downwardly, the result is to open one circuit and close another. The circuit controlled by the contacts 211—212 is a shorting circuit and includes a contact 215 centrally disposed on an armature 216 adapted to be operated by either one of the magnets 217 or 218 connected respectively in the output circuits of the amplifiers 122b and 122a.

This contact 215 is between and may contact with either one of two spring contacts 219 or 220, both connected to a conductor 221 which leads back to the contact 212. The conductor 214 is in turn connected through a battery 222 to the conductor 133, and the conductor 221 is connected directly to the conductor 134.

These conductors 133 and 134 are connected to opposite sides of the magnet 135 controlling switches 136' and 137'. These switches operate in much the same manner as the switches 136 and 137, except that in the present embodiment the magnet 135 is normally energized, whereas in the first described embodiment it is normally deenergized. The reason for this will be more fully described later.

Connected to the circuits of one of the cells, here shown as the cell 73a, are conductors 223 and 224 containing two high resistance units 225 and 226, and the circuit through these resistances comprises a switch 227 which is adapted to be closed by the shutter or pointer when at zero position, as indicated in Figs. 21 and 24.

Assuming that the pointer is at zero, then the circuit through the lamps is broken between the contacts 209 and 210, while the contacts 211 and 212, and 215 and 219, are in engagement, respectively. The various holes in the shutter occupy the positions shown in Figs. 22 and 24 and the magnets 217 and 218 are deenergized.

As soon as the pointer and shutter have moved a distance corresponding to one unit of measurement, then the next to the last hole 77—2 will come into registry with the lamp 74b as previously described, and as shown in Fig. 22—A, and will thus affect the cell 73b, energizing the magnet 217 and attracting the armature 216 to that magnet and away from the magnet 218. This will break the circuit between the contacts 215 and 219 and after a very short interval of time will make a circuit between the contacts 215 and 220. This action will momentarily deenergize the magnet 135 by breaking the circuit through the battery 222 and the magnet, thus permitting the switches 136' and 137' to close. When, however, the contact 215 engages the contact 220, the circuit is again completed through the magnet 135 and the battery 222, again opening the switches 136' and 137'. The result is the sending of an impulse to the magnet 135, which causes it to act in the same manner as described above in the first described embodiment, and then the immediate breaking of the circuit of that magnet, so that no further impulses may be sent no matter how much the shutter may vibrate.

The two magnets 217 and 218 are so constructed that the armature will stay in position against the core of the magnet last energized. Now assuming that the shutter and pointer move a distance corresponding to another unit of weight, the last hole 77—1 will come in registry with the lamp 74a and cell 73a, as shown in Fig. 22—B, and thus energize the magnet 218, which will cause an impulse to be sent to the magnet 135 in the same manner as just described above.

These operations will be repeated as each hole comes into registry with one of the lamps and its corresponding cell until the thread breaks, and the registry of a hole with a lamp results in only one impulse.

When the thread breaks, the bracket 6 will rise to the position shown in Figs. 23 and 24, opening the lamp circuit by moving the contact 209 out of engagement with the contact 210 and closing the shorting circuit by engagement of the contacts 211 and 212.

While the pointer and shutter are returning to zero, the lamps will thus be extinguished and no light will reach the cells from the lamps and thus no impulses will be sent. As the shutter and pointer reach zero, the switch 227 will be closed, short circuiting the input to the amplifier 122a, causing an impulse of current to flow through the magnet 218 in the same manner as if light reached the cell 73a, and thus causing the armature 216 to return to the position indicated, if not already there. If already there, the short circuiting has no effect.

The above operation is used in order to insure that the armature 216 shall always be at the indicated position when the pointer is at zero.

Assuming that the armature 216 is moved from engagement with the core of the magnet 217 to engage with the core of the magnet 218, or, in other words, to the position indicated, as just described, then that act would cause an impulse to be sent to the magnet 135 unless some means were provided to prevent it. Such means is provided by the shorting circuit comprising the conductor 214, contacts 211 and 212, and conductor 221, thus providing a short circuit between the conductors 214 and 221 and avoiding the sending of any impulse to the magnet 135 through the battery 222.

Referring now to Figs. 25 to 30, inclusive, I have shown therein another form which may be used in connection with a recording mechanism of a different type from the calculating machine previously described.

The motor and clamp solenoids are operated in the same manner as before, and they have not been indicated in the figures being described. The rectifier 129 is shown as connected to a source of supply 108 and 109 through a hand-operated switch 228. I also employ an amplifier 122 in the same manner as before, to control the sending of impulses to the magnet 135 of a quick-acting relay.

The shutter 76 may be of either one of the constructions described above, although for the sake of convenience I have shown it as passing between one lamp 74 and one cell 73.

The various solenoids 229—1 to 229—32, inclusive, are connected to correspondingly numbered contacts 230 cooperating with a wiping contact 231 of a rotary switch having homing contacts 232 cooperating with a wiping contact 233.

Impulses received by the quick-acting relay cause a step by step movement of the wiping contact 231 to select the contact 230 corresponding to the solenoid 229 which is to be energized.

The wiping contact 231 continues its movement until the thread breaks, at which time it stops upon one of the contacts 230 and then the impulses stop coming to the quick-acting relay. Then slow release relay No. 1 will drop out of action, taking the current off the vibrating reed relay, but this relay will continue vibrating for a short time, thus continuing energizing slow release relay No. 2. When slow release No. 1 dropped out, it permitted closing of switch 234, and since the switch 235 would still be closed by the energizing of slow release relay No. 2, a circuit would be completed, including conductors 236, switch 235, conductor 237, switch 234, and conductor 238, through the contact 231, the selected contact 230 and the solenoid corresponding thereto, through the conductor 239, back to the rectifier 129. Thus the selected solenoid would be energized.

A series of lamps 240, one for each of the solenoids 229—1 to 229—32, inclusive, may be arranged as indicated in Fig. 25, and in such a manner that a switch 241 for each lamp may be closed by energizing of the corresponding solenoid. These lamps through their switches are arranged in parallel and connected to the rectifier 129 by means of the conductors 239 and 242.

At the same time the selected solenoid 229 was energized, the solenoid 243 would likewise be energized, and this will operate a standard counter of suitable construction; for example, the counter commonly referred to as Veeder-Root counter, of the U. D. type, and which may display a numeral at the window 244 (Fig. 27). Thus, at this window will be shown the number of times the device has operated to break a thread.

As the rotary switch described above is operated, each impulse will close a switch 245 to energize a solenoid 246, which may be used to operate a counter of any suitable construction, such as the Veeder-Root of the U. D. type mentioned above, and display a figure at a window 247 (Fig. 27), thus showing at that window the total number of impulses or the total measurement at any time.

When slow release relay No. 2 becomes deenergized, current is supplied to the homing contacts 232 to cause the rotary switch to "go home" in the manner well known in the art.

In Figs. 26 to 30, inclusive, I have indicated a form of mechanism which may be operated by the solenoids 229. These solenoids are indicated as arranged one above the other, and in this embodiment the solenoids corresponding to the odd numbers are arranged on top, and those corresponding to the even numbers are arranged beneath. The armature 247 of each solenoid is provided with a nose 248 which, when the solenoid is operated, will be moved upwardly and cause one contact 249 of a switch 241 to engage the other contact 250 of the same switch, thus closing the circuit to the corresponding lamp 240.

Each armature is also provided with a collar 251 engaging one end of a lever 252, the other end of which has pawls 253 pivoted thereon and engaging ratchets 254 rotating on a shaft 255 of a suitable counter. Each ratchet 254 is fastened to a disk 256 rotatable on the shaft 255 and having a periphery 258 upon which a series of numbers from zero to 9 are arranged, as plainly shown in Fig. 30.

The ratchets operate together in a well known manner so that the left-hand disk, as viewed in Fig. 30, will be actuated only once for every ten actuations of the right-hand disk. Each movement of a disk will cause one number to move out of registry with one of the windows 259, and another number to move into registry with that same window. In this embodiment, the notches on the left-hand ratchet 254, as viewed in Fig. 30, are deeper than the notches on the right-hand ratchet, with one exception. The result will be that the two pawls will move together, but only the pawl engaging the ratchet to the right of Fig. 30 will operate until that pawl reaches the deep notch on that ratchet, and then as it drops into that deep notch, the pawl at the left of Fig. 30 may drop into a notch on its ratchet and cause one actuation of that ratchet and the disk attached thereto.

The above arrangement is one well-known expedient for turning one disk ten times to another disk once. The mechanism per se forms no part of my invention, since any other suitable form of mechanism may be used in its place, and therefore a further detail description of it will not be given.

When this form of device is used, there will be displayed at each window 259 a number representing the number of times that a thread has been broken by the force whose amount corresponds to that window. For example, if a thread has broken twice when subjected to a force of 26 ounces, then the window 259 under No. 26 will show the number 2. The other windows will likewise show the number of breaks, if any, that may have occurred under corresponding forces, while, as noted above, the number of breaks will appear at window 244, and the total force measurement will appear at window 247.

When it is desired to clear the machine, the shaft 255 may be given a manual rotation by means not shown, to return all counters to zero, it being understood that all counters are mounted upon a common shaft and that the two disks with the corresponding numbers on the peripheries thereof will appear at each of the windows 259 shown in Fig. 27. The entire mechanism may be contained in a casing 260 behind a panel 261, and the solenoids, counter, etc., may be mounted upon a back panel 262.

Referring now to Figs. 31 and 32, I have shown therein a type of rotary switch which may be employed in connection with the various circuits described above. Assume that the switch illustrated in these two figures is rotary switch No. 1 mounted upon the shaft 145. The stationary contacts are arranged in banks, the contacts 149 being arranged in two banks, the contacts 150 in two other banks, and the contacts 151 in two other banks. In order to avoid the necessity of an unusually large switch, each bank consists of only twenty-five contacts, and therefore the contacts are arranged in two separate banks, and instead of one wiping contact 146, I have indicated two such contacts. Similarly, instead of one wiping contact 147 and 148, respectively, I have shown two such contacts. This expedient is well known in the art.

The wiping contacts 146, 147, and 148 are all secured to the shaft 145 but insulated from each other. Intermittent rotation of the shaft with the wiping contact thereon is obtained by means of the magnet 141 having an armature 263 pivoted at 264 upon a frame 265, and having an upwardly extending arm 266 provided at its upper end with a pivoted pawl 267 engaging a ratchet 268 secured to the shaft 145 and held against counterclockwise movement, as viewed in Fig. 31, by means of a spring detent 269. The armature is held in normal position by means of a spring 270.

In operation, as an impulse energizes the magnet 141, it will be seen that the arm 266 of the armature is moved towards the right of Fig. 31, and then as the effect of the impulse stops and the magnet is deenergized, the spring 270 will cause the pawl 267 to actuate the ratchet one step.

Upon each movement of the arm 266 towards the right of Fig. 31, a button 271 carried thereby will open the homing contacts 272 and 273 by engagement with the contact 273. These contacts will be closed upon the spring causing the actuation of the pawl and ratchet as described above.

The homing switch 152 comprising the contacts 272 and 273 is in a circuit, as shown in Fig. 20—B, which includes the wiping contact 146 and the homing contacts 149 and also the magnet 141. When slow release relay No. 3 permits the closing of this circuit, then the operation of the pawl and ratchet will be repeated indefinitely until the wiping contact 146 engages one of the bank contacts 149 which is not energized. As plainly indicated in Fig. 20—B, the zero contact 149 is a blank so that when the wiping contact 146 engages that blank contact, the rotation of the switch will cease.

The general construction of the type of rotary switch described above is known in the art, as is also the necessary construction of relays to make them operate relatively slowly. It has not been thought necessary to describe any particular construction of slow-acting relay, nor for that matter of a vibrating reed relay, since that type of relay is also well known in the electrical art.

For the sake of illustration, I have shown various more or less specific types of apparatus, but it will be readily understood that the invention is not limited to those specific forms.

Furthermore, while I have shown the invention as employed in testing thread, and have used the word "thread" as defining the material being tested, it will be obvious that the specific apparatus could be equally well employed to test wire or rope or in fact any material capable of being fed in the manner illustrated.

It will also be apparent that many features of the invention may be employed for making other measurements than those which may be made on a scale. These features, more particularly those involving the use of the electrical circuits, may be used, for example, in counting batches of articles or for counting units of the same articles. This feature may also be used in connection with the recording of many other kinds of measurements, which it is not deemed necessary to list here.

In short, while I have shown the invention as embodied in specific forms, it is to be understood that various changes in details may be made without departing from the scope of the invention, as defined by the appended claims.

I claim:

1. A thread testing device comprising an indicator, an indicator clamp connected to and adapted to operate said indicator, a breaking clamp movable independently of said indicator clamp, means to feed successive lengths of thread into engagement with both of said clamps, means to actuate said clamps to engage and disengage the thread, means to move the breaking clamp away from the indicator clamp to exert tension on the thread therebetween and thereby to cause operation of the indicator, means to hold the indicator in indicating position after breaking of the thread between the clamps, means to release said holding means, and means to then return the indicator to zero position.

2. A thread testing device comprising a pair of clamps, means to move one clamp of the pair relatively to the other to exert tension on thread held by the clamps, means to measure the amount of said tension, a source of supply of thread, a rotary frame having a plurality of feed clamps spaced around the center thereof and each adapted to engage thread, means to intermittently rotate said frame to bring two of said feed clamps into position to place a length of thread in engagement with the two clamps of the pair, means to cause the feed clamp furthest from the source of supply to clamp the thread therein, and means rendering inoperative the feed clamps between said source of supply and said furthest feed clamp.

3. A thread testing device comprising a pair of clamps, means to move one clamp of the pair relatively to the other to exert tension on thread held by the clamps, means to measure the amount of said tension, a source of supply of thread, a rotary frame having a plurality of feed clamps spaced around the center thereof and each adapted to engage thread, means to intermittently rotate said frame to bring two of said feed clamps into position to place a length of thread in engagement with the two clamps of the pair, means to cause the feed clamp furthest from the source of supply to clamp the thread therein, means rendering inoperative the feed clamps between said source of supply and said furthest feed clamp, and means to release said furthest clamp after exertion of said tension, to release the thread therefrom.

4. A thread testing device comprising a pair of clamps, means to move one clamp of the pair relatively to the other to exert tension on thread held by the clamps, means to measure the amount of said tension, a source of supply of thread, a rotary frame having two feed clamps spaced around the center thereof and each adapted to engage thread, said feed clamps being adapted to be located on opposite sides of said pair of clamps, the feed clamp on the side furthest from said source of supply holding the thread therein, a release member maintaining open the other feed clamp of said two, and means to intermittently rotate said frame, said release member permitting closing of said other feed clamp upon said rotation.

5. A thread testing device comprising a rotary frame having a plurality of feed clamps spaced around the center thereof and each adapted to receive thread therein, means to rotate said frame, and means to release at least one of said clamps upon said rotation.

6. A thread testing device comprising a rotary frame, with a feed clamp thereon, said clamp comprising two jaws, one movable relatively to the other, and a spring normally holding said jaws together.

7. A thread testing device comprising a rotary frame, with a feed clamp thereon, said clamp comprising two jaws, one movable relatively to the other, and a spring normally holding said jaws together, said jaws flaring outwardly from the center thereof to form a guide for the passage of thread not held between the jaws.

8. A thread testing device comprising a rotary frame, with a feed clamp thereon, said clamp comprising two jaws, one movable relatively to the other, a spring normally holding said jaws together, means to rotate said frame, and means actuated by said rotation to open said jaws against the action of said spring.

9. A thread testing device comprising a rotary frame, with a feed clamp thereon, said clamp comprising two jaws, one movable relatively to the other, a plunger passing through the stationary jaw and secured to the movable jaw, and a spring acting on said plunger to urge said jaws together.

10. A thread testing device comprising a rotary frame, with a feed clamp thereon, said clamp comprising two jaws, one movable relatively to the other, a plunger passing through the stationary jaw and secured to the movable jaw, a spring acting on said plunger to urge said jaws together, means to rotate said frame, and means actuated by said rotation to open said jaws against the action of said spring.

11. A thread testing device comprising a rotary frame, with a feed clamp thereon, said clamp comprising two jaws, one movable relatively to the other, a spring normally holding said jaws together, means to intermittently rotate said frame to bring one of said feed clamps to a predetermined position, and means at that position to hold the jaws open.

12. A thread testing device comprising a rotary frame, with a feed clamp thereon, said clamp comprising two jaws, one movable relatively to the other, a plunger passing through the stationary jaw and secured to the movable jaw, a spring acting on said plunger to urge said jaws together, means to break a length of thread held by said clamp, and means preventing the broken end from winding around said plunger.

13. A thread testing device comprising a rotary frame, with a feed clamp thereon, said clamp comprising two jaws, one movable relatively to the other, a spring normally holding said jaws together, means to break a length of thread held by said clamp, means to release the clamp, and means causing the broken end to fall outwardly when broken, whereby when the clamp is released, the broken end will fall clear of the clamp.

14. A thread testing device comprising two clamps adapted to engage a thread, a solenoid adapted to actuate each of said clamps to clamp a length of thread therein, means to move one of said clamps relative to the other to exert tension on said thread, and means to operate said solenoids to actuate said clamps and thereby engage or release said thread.

15. A thread testing device comprising two clamps adapted to engage a thread, a solenoid adapted to actuate each of said clamps to clamp a length of thread therein, means to move one of said clamps relative to the other to exert tension on said thread, and means controlled by said moving means to operate said solenoids to actuate said clamps and thereby engage or release said thread.

16. A thread testing device comprising two clamps adapted to engage a thread, a cam shaft having a cam to cause movement of one of said clamps relative to the other to exert tension on thread held thereby, means operated by said cam shaft to successively feed lengths of thread into position to be engaged by said clamps, a solenoid adapted to actuate each of said clamps, and a switch controlled by rotation of said cam shaft and controlling said solenoids.

17. A thread testing device comprising a pair of clamps, means to move one clamp of the pair relatively to the other to exert tension on thread held by the clamps, means to measure the amount of said tension, a source of supply of thread, a rotary frame having a plurality of feed clamps spaced around the center thereof and each adapted to engage thread, and means to intermittently rotate said frame to bring two of said feed clamps into position to place a length of thread in engagement with the two clamps of the pair.

18. A thread testing device comprising an indicator having a movable part, a clamp mounted on said part, a breaking clamp, a source of supply of thread, a rotary frame having a plurality of feed clamps spaced around the center thereof and each adapted to engage thread, means to intermittently rotate said frame to bring two of its feed clamps into position to place a length of thread in engagement with said indicator clamp and said breaking clamp, means to move said breaking clamp away from said indicator clamp to break the thread therebetween, and means to operate all of said clamps to engage and disengage the thread.

19. A thread testing device comprising an indicator having a movable part, a clamp mounted on said part, a breaking clamp, a source of supply of thread, a rotary frame having a plurality of feed clamps spaced around the center thereof and each adapted to engage thread, means to intermittently rotate said frame to bring two of its feed clamps into position to place a length of thread in engagement with said indicator clamp and said breaking clamp, means to move said breaking clamp away from said indicator clamp to break the thread therebetween, means controlled by movement of the frame to operate the feed clamps thereon, and other means, controlled by the means for moving the breaking clamp, to operate the indicator clamp and breaking clamp.

20. A thread testing device comprising an indicator having a movable part, a clamp mounted on said part, a breaking clamp, a source of supply of thread, a rotary frame having a plurality of feed clamps spaced around the center thereof and each adapted to engage thread, means to intermittently rotate said frame to bring two of its feed clamps into position to place a length of thread in engagement with said indicator clamp and said breaking clamp, a lever on which said breaking clamp is mounted, a cam adapted to operate said lever to move the breaking clamp away from the indicator clamp to break the thread therebetween, and means to operate all of said clamps to engage and disengage the thread.

21. A thread testing device comprising an indicator having a movable part, a clamp mounted on said part, a breaking clamp, a source of supply of thread, a rotary frame having a plurality of feed clamps spaced around the center thereof and each adapted to engage thread, means to intermittently rotate said frame to bring two of its feed clamps into position to place a length of thread in engagement with said indicator clamp and said breaking clamp, a lever on which said breaking clamp is mounted, a cam adapted to operate said lever to move the breaking clamp away from the indicator clamp to break the thread therebetween, means to operate the indicator and breaking clamps upon movement of said cam, and means to operate the feeding clamps upon movement of said frame.

22. A thread testing device comprising an indicator having a movable part, a clamp mounted on said part, a breaking clamp, a source of supply of thread, a rotary frame having a plurality of feed clamps spaced around the center thereof and each adapted to engage thread, means to intermittently rotate said frame to bring two of its feed clamps into position to place a length of thread in engagement with said indicator clamp and said breaking clamp, means to move said breaking clamp away from said indicator clamp to break the thread therebetween, means to operate all of said clamps to engage and disengage the thread, a pointer on said indicator, means to hold the pointer in the position it occupies when the thread breaks, and means to release the pointer and to return it to zero position.

23. A thread testing device comprising an indicator having a movable part, a clamp mounted on said part, a breaking clamp, a source of supply of thread, a rotary frame having a plurality of feed clamps spaced around the center thereof and each adapted to engage thread, means to intermittently rotate said frame to bring two of its feed clamps into position to place a length of thread in engagement with said indicator clamp and said breaking clamp, means to move said breaking clamp away from said indicator clamp to break the thread therebetween, a solenoid associated with each of said indicator and breaking clamps, means controlled by said solenoids to operate their respective clamps, means to actuate said solenoids, and means to operate said feeding clamps.

24. A thread testing device comprising an indicator having a movable part, a clamp mounted on said part, a breaking clamp, a source of supply of thread, a rotary frame having a plurality of feed clamps spaced around the center thereof and each adapted to engage thread, means to intermittently rotate said frame to bring two of its feed clamps into position to place a length of thread in engagement with said indicator clamp and said breaking clamp, means to move said breaking clamp away from said indicator clamp to break the thread therebetween, a solenoid associated with each of said indicator and breaking clamps, means controlled by said solenoids to operate their respective clamps, means to actuate said solenoids, means to operate said feeding clamps, a pointer on said indicator, means to hold the pointer in the position it occupies when the thread breaks, a solenoid controlling operation of said holding means, and means to actuate said last-named solenoid after breaking of the thread.

25. A thread testing device comprising an indicator having a movable part, a clamp mounted on said part, a breaking clamp, a source of supply of thread, a rotary frame having a plurality of feed clamps spaced around the center thereof and each adapted to engage thread, means to intermittently rotate said frame to bring two of its feed clamps into position to place a length of thread in engagement with said indicator clamp and said breaking clamp, means to move said breaking clamp away from said indicator clamp to break the thread therebetween, means to operate all of said clamps to engage and disengage the thread, and means to automatically stop said operations after a predetermined number thereof.

26. A thread testing device comprising an indicator having a movable part, a clamp mounted on said part, a breaking clamp, a source of supply of thread, a rotary frame having a plurality of feed clamps spaced around the center thereof and each adapted to engage thread, means to intermittently rotate said frame to bring two of its feed clamps into position to place a length of thread in engagement with said indicator clamp and said breaking clamp, means to move said breaking clamp away from said indicator clamp to break the thread therebetween, means to operate all of said clamps to engage and disengage the thread, a pointer on said indicator, means to hold the pointer in the position it occupies when the thread breaks, means to release the pointer and to return it to zero position, and means to automatically stop said operations after a predetermined number thereof.

27. A thread testing device comprising an indicator having a movable part, a clamp mounted on said part, a breaking clamp, a source of supply of thread, a rotary frame having a plurality of feed clamps spaced around the center thereof and each adapted to engage thread, means to intermittently rotate said frame to bring two of its feed clamps into position to place a length of thread in engagement with said indicator clamp and said breaking clamp, means to move said breaking clamp away from said indicator clamp to break the thread therebetween, means to operate all of said clamps to engage and disengage the thread, means to automatically stop said operations after a predetermined number thereof, and means to vary said predetermined number.

28. A thread testing device comprising an indicator having a movable part, a clamp mounted on said part, a breaking clamp, a source of supply of thread, a rotary frame having a plurality of feed clamps spaced around the center thereof and each adapted to engage thread, means to intermittently rotate said frame to bring two of its feed clamps into position to place a length of thread in engagement with said indicator clamp and said breaking clamp, means to move said breaking clamp away from said indicator clamp to break the thread therebetween, means to operate all of said clamps to engage and disengage the thread, a pointer on said indicator, means to hold the pointer in the position it occupies when the thread breaks, means to release the pointer and to return it to zero position, means to automatically stop said operations after a predetermined number thereof, and means to vary said predetermined number.

THOMAS J. NUNAN.